(12) United States Patent
Islam et al.

(10) Patent No.: US 10,506,639 B2
(45) Date of Patent: Dec. 10, 2019

(54) RACH CONVEYANCE OF DL SYNCHRONIZATION BEAM INFORMATION FOR VARIOUS DL-UL CORRESPONDENCE STATES

(71) Applicant: QUALCOMM Incorporated, San Diego, CA (US)

(72) Inventors: Muhammad Nazmul Islam, Edison, NJ (US); Sundar Subramanian, Bridgewater, NJ (US); Junyi Li, Chester, NJ (US); Navid Abedini, Raritan, NJ (US); Bilal Sadiq, Basking Ridge, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/674,287

(22) Filed: Aug. 10, 2017

(65) Prior Publication Data

US 2018/0049177 A1 Feb. 15, 2018

Related U.S. Application Data

(60) Provisional application No. 62/374,735, filed on Aug. 12, 2016, provisional application No. 62/379,209, (Continued)

(51) Int. Cl.
*H04W 74/08* (2009.01)
*H04W 56/00* (2009.01)
(Continued)

(52) U.S. Cl.
CPC ........ *H04W 74/0833* (2013.01); *H04B 7/063* (2013.01); *H04B 7/0617* (2013.01); (Continued)

(58) Field of Classification Search
CPC ... H04L 5/0048; H04L 5/0051; H04L 5/0023; H04L 5/00; H04B 7/2665; H04B 7/2627; (Continued)

(56) References Cited

U.S. PATENT DOCUMENTS

2006/0164969 A1* 7/2006 Malik et al. ............... 370/203
2009/0143073 A1* 6/2009 Hovers et al. .......... 455/452.2
(Continued)

FOREIGN PATENT DOCUMENTS

WO WO-2016086144 A1 6/2016

OTHER PUBLICATIONS

InterDigital Communications, "Random Access Aspects for Beam-Based NR Initial Access," 3GPP TSG-RAN WG1 Meeting #86bis, R1-1610320, Lisbon, Portugal, Oct. 10-14, 2016, 5 pgs., XP051160018, 3rd Generation Partnership Project.
(Continued)

*Primary Examiner* — Meless N Zewdu
(74) *Attorney, Agent, or Firm* — Holland & Hart, LLP; Clint R. Morin

(57) ABSTRACT

Methods, systems, and devices for wireless communication are described. A user equipment (UE) may receive a downlink (DL) signal from a base station on one or more DL beam(s). The UE may identify a selected DL beam of the one or more DL beam(s) for communications from the base station to the UE. The UE may transmit a beam recovery or beam tracking message to the base station using at least one of a resource or a waveform selected based at least in part on the selected DL beam.

30 Claims, 19 Drawing Sheets

Related U.S. Application Data filed on Aug. 24, 2016, provisional application No. 62/406,377, filed on Oct. 10, 2016, provisional application No. 62/407,423, filed on Oct. 12, 2016, provisional application No. 62/418,072, filed on Nov. 4, 2016.

(51) Int. Cl.

| | | |
|---|---|---|
| *H04W 72/02* | (2009.01) | |
| *H04W 72/04* | (2009.01) | |
| *H04W 72/08* | (2009.01) | |
| *H04W 16/28* | (2009.01) | |
| *H04W 48/20* | (2009.01) | |
| *H04B 7/06* | (2006.01) | |
| *H04L 5/00* | (2006.01) | |
| *H04B 7/08* | (2006.01) | |
| *H04W 88/02* | (2009.01) | |
| *H04W 88/08* | (2009.01) | |
| *H04B 7/26* | (2006.01) | |
| *H04W 72/12* | (2009.01) | |

(52) U.S. Cl.
CPC ......... *H04B 7/0619* (2013.01); *H04B 7/0695* (2013.01); *H04B 7/088* (2013.01); *H04L 5/0023* (2013.01); *H04L 5/0051* (2013.01); *H04W 16/28* (2013.01); *H04W 48/20* (2013.01); *H04W 56/00* (2013.01); *H04W 56/001* (2013.01); *H04W 72/02* (2013.01); *H04W 72/042* (2013.01); *H04W 72/046* (2013.01); *H04W 72/085* (2013.01); *H04B 7/2665* (2013.01); *H04B 7/2668* (2013.01); *H04B 7/2671* (2013.01); *H04L 5/0048* (2013.01); *H04W 72/0413* (2013.01); *H04W 72/1236* (2013.01); *H04W 88/02* (2013.01); *H04W 88/08* (2013.01)

(58) Field of Classification Search
CPC ...... H04B 7/0617; H04B 7/088; H04B 7/063; H04B 7/0695; H04B 7/0619; H04B 7/2668; H04B 7/2671; H04W 48/12; H04W 72/04; H04W 72/046; H04W 72/085; H04W 72/1236; H04W 72/0413; H04W 72/02; H04W 72/042; H04W 88/02; H04W 88/08; H04W 56/001; H04W 48/20; H04W 16/28; H04W 74/0833; H04W 72/1289; H04W 74/00; H04W 74/002; H04W 74/004; H04W 72/1226; H04W 74/006; H04W 56/00; H04W 72/0406; H04W 72/1278; H04W 72/1284; H04W 72/00; H04W 88/00
See application file for complete search history.

(56) References Cited

U.S. PATENT DOCUMENTS

| | | | |
|---|---|---|---|
| 2011/0281612 A1* | 11/2011 | Ishii et al. | 455/522 |
| 2013/0072243 A1* | 3/2013 | Yu et al. | 455/509 |
| 2013/0217404 A1 | 8/2013 | Jung | |
| 2014/0004898 A1 | 1/2014 | Yu et al. | |
| 2014/0010178 A1* | 1/2014 | Yu et al. | H04W 74/0833 |
| 2014/0177607 A1 | 6/2014 | Li et al. | |
| 2015/0009951 A1 | 1/2015 | Josiam et al. | |
| 2015/0382205 A1 | 12/2015 | Lee et al. | |
| 2016/0087706 A1 | 3/2016 | Guey et al. | |
| 2016/0099763 A1* | 4/2016 | Chen | H04B 7/0617 |
| 2016/0119887 A1 | 4/2016 | Charipadi et al. | |
| 2017/0006593 A1 | 1/2017 | Liu | |
| 2017/0026962 A1* | 1/2017 | Liu et al. | H04W 72/0446 |
| 2017/0033854 A1* | 2/2017 | Yoo | H04B 7/0617 |
| 2017/0094531 A1* | 3/2017 | Kakishima et al. | H04W 16/28 |
| 2017/0207843 A1* | 7/2017 | Jung et al. | H04B 7/0632 |
| 2018/0042000 A1 | 2/2018 | Zhang et al. | |
| 2018/0049116 A1 | 2/2018 | Islam et al. | |
| 2018/0049167 A1 | 2/2018 | Islam et al. | |
| 2018/0049245 A1 | 2/2018 | Islam et al. | |
| 2018/0176065 A1* | 6/2018 | Deng et al. | H04L 27/2673 |
| 2018/0176801 A1* | 6/2018 | Rune | H04W 24/08 |
| 2018/0242300 A1* | 8/2018 | Hakola et al. | H04W 72/046 |
| 2019/0104549 A1 | 4/2019 | Deng et al. | |

OTHER PUBLICATIONS

ISA/EP, International Search Report and Written Opinion of the International Searching Authority, Int'l Application No. PCT/US2017/046431, dated Oct. 30, 2017, European Patent Office, Rijswijk, NL, 17 pgs.

Qualcomm Incorporated, "Reciprocity vs Non-Reciprocity in Initial Access/RACH," 3GPP TSG RAN WG1 Meeting #87, R1-1612037, Reno, Nevada, USA, Nov. 14-18, 2016, 10 pgs., XP051190270, 3rd Generation Partnership Project.

Samsung, "Random Access Procedure in NR," 3GPP TSG-RAN WG2 Meeting #94, R2-163372, Nanjing, China, May 23-27, 2016, 7 pgs., XP051104903, 3rd Generation Partnership Project.

Xinwei, "Further Discussion on Beam Management in Random Access Procedures," 3GPP TSG-RAN WG1 Meeting #87, R1-1612255, Reno, Nevada, Nov. 14-18, 2016, 8 pgs., XP051189234, 3rd Generation Partnership Project.

* cited by examiner

RACH CONVEYANCE OF DL SYNCHRONIZATION BEAM INFORMATION FOR VARIOUS DL-UL CORRESPONDENCE STATES

CROSS REFERENCES

The present Application for Patent claims priority to U.S. Provisional Patent Application No. 62/374,735 by Islam, et al., entitled "RACH Conveyance of DL Synchronization Beam Information For Various DL-UL Reciprocity States," filed Aug. 12, 2016 and to U.S. Provisional Patent Application No. 62/379,209 by Islam, et al, entitled "RACH Conveyance of DL Synchronization Beam Information For Various DL-UL Reciprocity States," filed Aug. 24, 2016 and to U.S. Provisional Patent Application No. 62/406,377 by Islam, et al., entitled "RACH Conveyance of DL Synchronization Beam Information For Various DL-UL Reciprocity States," filed Oct. 10, 2016, and to U.S. Provisional Patent Application No. 62/407,423 by Islam, et al., entitled "RACH Conveyance of DL synchronization Beam Information For Various DL-UL Reciprocity States" filed Oct. 12, 2016 and to U.S. Provisional Patent Application No. 62/418,072 by Islam, et al., entitled "RACH Conveyance of DL Synchronization Beam Information For Various DL-UL Reciprocity States," filed Nov. 4, 2016 and assigned to the assignee hereof.

BACKGROUND

The following relates generally to wireless communication, and more specifically to random access channel (RACH) conveyance of downlink (DL) synchronization beam information for various downlink-uplink (DL-UL) correspondence states.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless communication systems may operate in millimeter wave (mmW) frequency ranges, (e.g., 28 GHz, 40 GHz, 60 GHz, etc.). Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communications between two wireless nodes, (e.g., between a base station and a UE), may use beams or beam-formed signals for transmission and/or reception. A base station may transmit beamformed synchronization signals on downlink (DL) synchronization beams. A UE may receive a synchronization signal on one or more of the DL synchronization beams, and thus be enabled to initiate a RACH procedure with the base station. In some instances, the UE may send a message to the base station as part of the RACH procedure, and the base station may assume that the uplink (UL) beam on which the RACH message is received is representative of a DL beam which the base station should use in communicating with the UE. In other words, the base station assumes DL-UL correspondence. However, correspondence between the DL channel and UL channel may be missing, for various reasons. Thus, the base station assumption may be incorrect, meaning that the DL beam selected by the base station may not be the most appropriate beam for communications with the UE.

SUMMARY

The described techniques relate to improved methods, systems, devices, or apparatuses that support RACH conveyance of DL beam information for various DL-UL correspondence states. Generally, the described techniques provide for a base station to transmit DL signals to a UE. The DL signals may be transmitted on DL beam(s). The UE may use the DL beam from the DL beam(s) that can be used for communicating with the base station, (e.g., DL communications). The UE may select a resource and/or a random access channel (RACH) waveform for transmission of a RACH message, (e.g., RACH msg1, to the base station). In some aspects, the UE may select the resource and/or the waveform based on the DL beam. The UE may transmit the RACH message to the base station on the selected resource and/or the waveform. The base station may receive the RACH message on the resource and/or the waveform and identify the DL beam selected by the UE based on the resource and/or the waveform. The base station may use the selected DL beam for subsequent communications with the UE.

A method of wireless communication is described. The method may include receiving a DL signal from a base station on one or more DL beams, identifying a selected DL beam of the one or more DL beams for communications from the base station to the UE, and transmitting a RACH message/scheduling request message/beam recovery or beam tracking message to the base station using at least one of a resource or a waveform selected based at least in part on the selected DL beam.

An apparatus for wireless communication is described. The apparatus may include means for receiving a DL signal from a base station on one or more DL beams, means for identifying a selected DL beam of the one or more DL beams for communications from the base station to the UE, and means for transmitting a RACH message/scheduling request message/beam recovery or beam tracking message to the base station using at least one of a resource or a waveform selected based at least in part on the selected DL beam.

Another apparatus for wireless communication is described. The apparatus may include a processor, memory in electronic communication with the processor, and instructions stored in the memory. The instructions may be operable to cause the processor to receive a DL signal from a base station on one or more DL beams, identify a selected DL beam of the one or more DL beams for communications from the base station to the UE, and transmit a RACH message/scheduling request message/beam recovery or beam tracking message to the base station using at least one of a resource or a waveform selected based at least in part on the selected DL beam.

A non-transitory computer readable medium for wireless communication is described. The non-transitory computer-readable medium may include instructions operable to cause a processor to receive a DL signal from a base station on one or more DL beams, identify a selected DL beam of the one or more DL beams for communications from the base station to the UE, and transmit a RACH message/scheduling request message/beam recovery or beam tracking message to the base station using at least one of a resource or a waveform selected based at least in part on the selected DL beam.

In some examples of the method, apparatus, and non-transitory computer-readable medium described above, the waveform comprises one of a scheduling request or a random access channel (RACH) waveform.

In some examples of the method, apparatus, and non-transitory computer-readable medium described above, the DL signal comprises a synchronization signal or a reference signal.

In some examples of the method, apparatus, and non-transitory computer-readable medium described above, the selected resource or waveform comprises: selecting the resource or the waveform based at least in part on an index of the selected DL beam. In some examples of the method, apparatus, and non-transitory computer-readable medium described above, the selected resource or waveform comprises: selecting the resource or the waveform based at least in part on a symbol of a subframe of the DL signal of the selected DL beam.

In some examples of the method, apparatus, and non-transitory computer-readable medium described above, transmitting the RACH message/scheduling request message/beam recovery or beam tracking message comprises: transmitting the RACH message/scheduling request message/beam recovery or beam tracking message during an entire duration of a corresponding random access subframe. In some examples of the method, apparatus, and non-transitory computer-readable medium described above, identifying the selected DL beam comprises: identifying a preferred DL beam based at least in part on a signal strength of the DL signal on the one or more DL beams, a signal quality of the DL signal on the one or more DL beams, or combinations thereof.

In some examples of the method, apparatus, and non-transitory computer-readable medium described above, identifying the selected DL beam comprises: identifying the DL beam based at least in part on the DL signal on the one or more DL beams meeting a transmit power condition. Some examples of the method, apparatus, and non-transitory computer-readable medium described above may further include processes, features, means, or instructions for selecting the resource or the waveform for transmission of the RACH message/scheduling request message/beam recovery or beam tracking message to the base station, the resource or waveform being selected based at least in part on the selected DL beam.

In some examples of the method, apparatus, and non-transitory computer-readable medium described above, selecting the waveform comprises: selecting a RACH preamble, a cyclic shift, or combinations thereof based at least in part on an index of the selected DL beam. In some examples of the method, apparatus, and non-transitory computer-readable medium described above, a correspondence is absent between the one or more DL beams and one or more uplink (UL) receive beams at the UE, wherein the absent correspondence is associated with the one or more DL beams having different beam directions than the one or more UL beams.

Some examples of the method, apparatus, and non-transitory computer-readable medium described above may further include processes, features, means, or instructions for identifying that correspondence is absent between the one or more DL beams from the base station and one or more uplink (UL) receive beams at the base station by receiving information from the base station in a master information block (MIB) or a system information block (SIB). Some examples of the method, apparatus, and non-transitory computer-readable medium described above may further include processes, features, means, or instructions for transmitting the RACH message/scheduling request message/beam recovery or beam tracking message to the base station during an entire duration of a RACH subframe based at least in part on the identification of the absent correspondence. Some examples of the method, apparatus, and non-transitory computer-readable medium described above may further include processes, features, means, or instructions for selecting the resource or waveform based at least in part on the identification of the absent correspondence.

Some examples of the method, apparatus, and non-transitory computer-readable medium described above may further include processes, features, means, or instructions for receiving the indication of the absent correspondence in a master information block (MIB) or a system information block (SIB). Some examples of the method, apparatus, and non-transitory computer-readable medium described above may further include processes, features, means, or instructions for transmitting an indication that correspondence is absent between the one or more DL beams from the base station and one or more UL beams at the UE. Some examples of the method, apparatus, and non-transitory computer-readable medium described above may further include processes, features, means, or instructions for transmitting the RACH message/scheduling request message/beam recovery or beam tracking message to the base station during a first symbol of a first random access subframe and a second symbol of a second random access subframe. Some examples of the method, apparatus, and non-transitory computer-readable medium described above may further include processes, features, means, or instructions for transmitting the indication of the absent correspondence in a RACH message 3, a physical uplink control channel (PUCCH), or a physical uplink shared channel (PUSCH).

Some examples of the method, apparatus, and non-transitory computer-readable medium described above may further include processes, features, means, or instructions for receiving an indication of a nature of correspondence between the one or more DL beams at the base station and one or more uplink (UL) beams at the base station, wherein the nature of correspondence corresponds to one of: full correspondence, partial correspondence, or no correspondence.

Some examples of the method, apparatus, and non-transitory computer-readable medium described above may further include processes, features, means, or instructions for determining that correspondence is present based on the indication of the nature of correspondence and selecting a transmission time for transmitting the RACH message/scheduling request message/beam recovery or beam tracking message to the base station based on the present correspondence. In some examples, the transmission time includes a symbol of a corresponding random access subframe. Some examples of the method, apparatus, and non-transitory computer-readable medium described above may further include processes, features, means, or instructions for determining that there is partial correspondence based on the indication of the nature of correspondence and selecting a transmission time for transmitting the RACH message/scheduling request message/beam recovery or beam tracking message to the base station based on the partial correspondence. In some examples, the transmission time includes multiple symbols of a corresponding random access subframe.

Some examples of the method, apparatus, and non-transitory computer-readable medium described above may further include processes, features, means, or instructions for selecting a transmission time, a frequency range, and a RACH preamble for transmitting the RACH message/scheduling request message/beam recovery or beam tracking message based on the nature of correspondence. Some examples of the method, apparatus, and non-transitory computer-readable medium described above may further include processes, features, means, or instructions for selecting the resource or waveform based at least in part on a symbol associated with the DL signal and the indication of the nature of correspondence. Some examples of the method, apparatus, and non-transitory computer-readable medium described above may further include processes, features, means, or instructions for receiving the indication of the nature of correspondence over a physical broadcast channel (PBCH) or an extended PBCH (ePBCH). Some examples of the method, apparatus, and non-transitory computer-readable medium described above may further include processes, features, means, or instructions for receiving the indication of the nature of correspondence in a MIB or a SIB.

In some examples of the method, apparatus, and non-transitory computer-readable medium described above, the selected DL beam from the base station may be different from a selected UL beam from the UE. In some examples of the method, apparatus, and non-transitory computer-readable medium described above, the one or more DL beams may be within a single symbol of a synchronization subframe, wherein selecting the resource or the waveform for transmission of the RACH message/scheduling request message/beam recovery or beam tracking message comprises: selecting the resource or the waveform based at least in part on the symbol of the selected DL beam.

In some examples of the method, apparatus, and non-transitory computer-readable medium described above, the resource may be associated with one or more tones in a component carrier. In some examples of the method, apparatus, and non-transitory computer-readable medium described above, the resource may be associated with a component carrier. Some examples of the method, apparatus, and non-transitory computer-readable medium described above may further include processes, features, means, or instructions for selecting a combination of the resource and the waveform to transmit the RACH message/scheduling request message/beam recovery or beam tracking message to the base station.

A method of wireless communication is described. The method may include transmitting a DL signal on one or more DL beams, receiving, on at least one of a resource or a waveform, a RACH message/scheduling request message/beam recovery or beam tracking message from a UE, identifying, based at least in part on the resource or the waveform, a selected DL beam of the one or more DL beams for communications from the base station to the UE, and transmitting one or more subsequent messages to the UE using the selected DL beam.

An apparatus for wireless communication is described. The apparatus may include means for transmitting a DL signal on one or more DL beams, means for receiving, on at least one of a resource or a waveform, a RACH message/scheduling request message/beam recovery or beam tracking message from a UE, means for identifying, based at least in part on the resource or the waveform, a selected DL beam of the one or more DL beams for communications from the base station to the UE, and means for transmitting one or more subsequent messages to the UE using the selected DL beam.

Another apparatus for wireless communication is described. The apparatus may include a processor, memory in electronic communication with the processor, and instructions stored in the memory. The instructions may be operable to cause the processor to transmit a DL signal on one or more DL beams, receive, on at least one of a resource or a waveform, a RACH message/scheduling request message/beam recovery or beam tracking message from a UE, identify, based at least in part on the resource or the waveform, a selected DL beam of the one or more DL beams for communications from the base station to the UE, and transmit one or more subsequent messages to the UE using the selected DL beam.

A non-transitory computer readable medium for wireless communication is described. The non-transitory computer-readable medium may include instructions operable to cause a processor to transmit a DL signal on one or more DL beams, receive, on at least one of a resource or a waveform, a RACH message/scheduling request message/beam recovery or beam tracking message from a UE, identify, based at least in part on the resource or the waveform, a selected DL beam of the one or more DL beams for communications from the base station to the UE, and transmit one or more subsequent messages to the UE using the selected DL beam.

In some examples of the method, apparatus, and non-transitory computer-readable medium described above, identifying the selected DL beam comprises: associating the resource or the waveform with an index of the selected DL beam. In some examples of the method, apparatus, and non-transitory computer-readable medium described above, identifying the selected DL beam comprises: associating the resource or the waveform with a symbol of a subframe of the DL signal of the selected DL beam.

In some examples of the method, apparatus, and non-transitory computer-readable medium described above, receiving the RACH message/scheduling request message/beam recovery or beam tracking message comprises: receiving the RACH message/scheduling request message/beam recovery or beam tracking message during an entire duration of a corresponding random access subframe. In some examples of the method, apparatus, and non-transitory computer-readable medium described above, receiving the RACH message/scheduling request message/beam recovery or beam tracking message comprises: receiving the RACH message/scheduling request message/beam recovery or beam tracking message on a plurality of UL beams.

Some examples of the method, apparatus, and non-transitory computer-readable medium described above may further include processes, features, means, or instructions for measuring a quality of the RACH message/scheduling request message/beam recovery or beam tracking message received on the plurality of UL beams. Some examples of the method, apparatus, and non-transitory computer-readable medium described above may further include processes, features, means, or instructions for determining a selected UL beam for communications from the UE to the base station based at least in part on the quality.

In some examples of the method, apparatus, and non-transitory computer-readable medium described above, measuring the quality of the RACH message/scheduling request message/beam recovery or beam tracking message comprises: measuring one or more of a reference signal received power (RSRP), a received signal strength indicator (RSSI), a reference signal received quality (RSRQ), a signal to noise ratio (SNR), or a signal to interference plus noise ratio (SINR). In some examples of the method, apparatus, and non-transitory computer-readable medium described above, identifying the selected DL beam further comprises: identifying the selected DL beam based at least in part on the resource or the waveform of the RACH message/scheduling request message/beam recovery or beam tracking message.

In some examples of the method, apparatus, and non-transitory computer-readable medium described above, identifying the selected DL beam comprises: identifying the selected DL beam based at least in part on a RACH preamble of the RACH message, a cyclic shift of the RACH message, or combinations thereof. In some examples of the method, apparatus, and non-transitory computer-readable medium described above, a correspondence is absent between the one or more DL beams from the base station and one or more uplink (UL) beams at the base station, wherein the absent correspondence is associated with the one or more DL beams having different beam directions than the one or more UL receive beams.

Some examples of the method, apparatus, and non-transitory computer-readable medium described above may further include processes, features, means, or instructions for identifying that correspondence is absent between the one or more DL beams from the base station and one or more uplink (UL) beams at the base station. Some examples of the method, apparatus, and non-transitory computer-readable medium described above may further include processes, features, means, or instructions for transmitting the indication of the absent correspondence in a MIB or a SIB.

Some examples of the method, apparatus, and non-transitory computer-readable medium described above may further include processes, features, means, or instructions for receiving an indication that correspondence is absent between the one or more DL beams from the base station and one or more UL beams from the UE and mapping DL beams used to transmit channel state information reference signals (CSI-RSs) to UL beams used to transmit sounding reference signals (SRS) or mapping UL beams used to transmit sounding reference signals (SRS) to DL beams used to transmit channel state information reference signals (CSI-RSs). Some examples of the method, apparatus, and non-transitory computer-readable medium described above may further include processes, features, means, or instructions for receiving an indication that correspondence is absent between the one or more DL beams from the base station and one or more UL beams from the UE and mapping DL beams used in DL beam training to UL beams used in UL beam training or mapping UL beams used in UL beam training to DL beams used in DL beam training.

In some examples of the method, apparatus, and non-transitory computer-readable medium described above, the selected DL beam from the base station may be different from a selected UL beam from the UE. In some examples of the method, apparatus, and non-transitory computer-readable medium described above, the resource may be associated with one or more tones in a component carrier. In some examples of the method, apparatus, and non-transitory computer-readable medium described above, the resource may be associated with a component carrier.

DETAILED DESCRIPTION

Free space path loss may increase with carrier frequency. Transmission in millimeter wave (mmW) systems may also be impacted from additional non-line-of-sight losses, (e.g., diffraction loss, penetration loss, oxygen absorption loss, foliage loss, etc.). During initial access, the base station and the user equipment (UE) may attempt to overcome these high path losses to discover or detect each other. Aspects of the present disclosure provide for improved initial access in a mmW system.

Aspects of the disclosure are initially described in the context of a wireless communications system. Generally, the described techniques provide for a UE to convey an indication to a base station of a selected downlink (DL) beam by selecting a corresponding resource and/or random access channel (RACH) waveform for transmission of a RACH message/scheduling request message/beam recovery or beam tracking message. For example, the base station may transmit DL signal(s) on DL beam(s). The UE may select a DL beam from the DL signal(s) that can be used for DL communications, (e.g., from the base station to the UE). The UE may select a resource and/or a waveform (e.g., a RACH waveform or a scheduling request waveform) for transmission of the RACH message/scheduling request message/beam recovery or beam tracking message to the base station, where the selection is based on the selected DL beam. The UE may then transmit the RACH message/scheduling request message/beam recovery or beam tracking message to the base station using the selected resource and/or RACH waveform. The base station receives the RACH message/scheduling request message/beam recovery or beam tracking message on the selected resource and/or RACH waveform and uses the resource and/or RACH waveform to identify the selected DL beam. In one non-limiting example, the UE may select a resource (e.g., channel) that corresponds to the timing feature of the DL signal(s) (e.g., symbol). The base station may then use the selected DL beam for communications from the base station to the UE, (e.g., for subsequent DL communications). In some aspects, a resource may refer to a time resource, a frequency resource, a time-frequency resource, and the like.

Aspects of the disclosure are further illustrated by and described with reference to apparatus diagrams, system diagrams, and flowcharts that relate to RACH conveyance of DL synchronization beam information for various DL-UL correspondence states. In some aspects, the term correspondence may refer to reciprocity.

Figure 1:
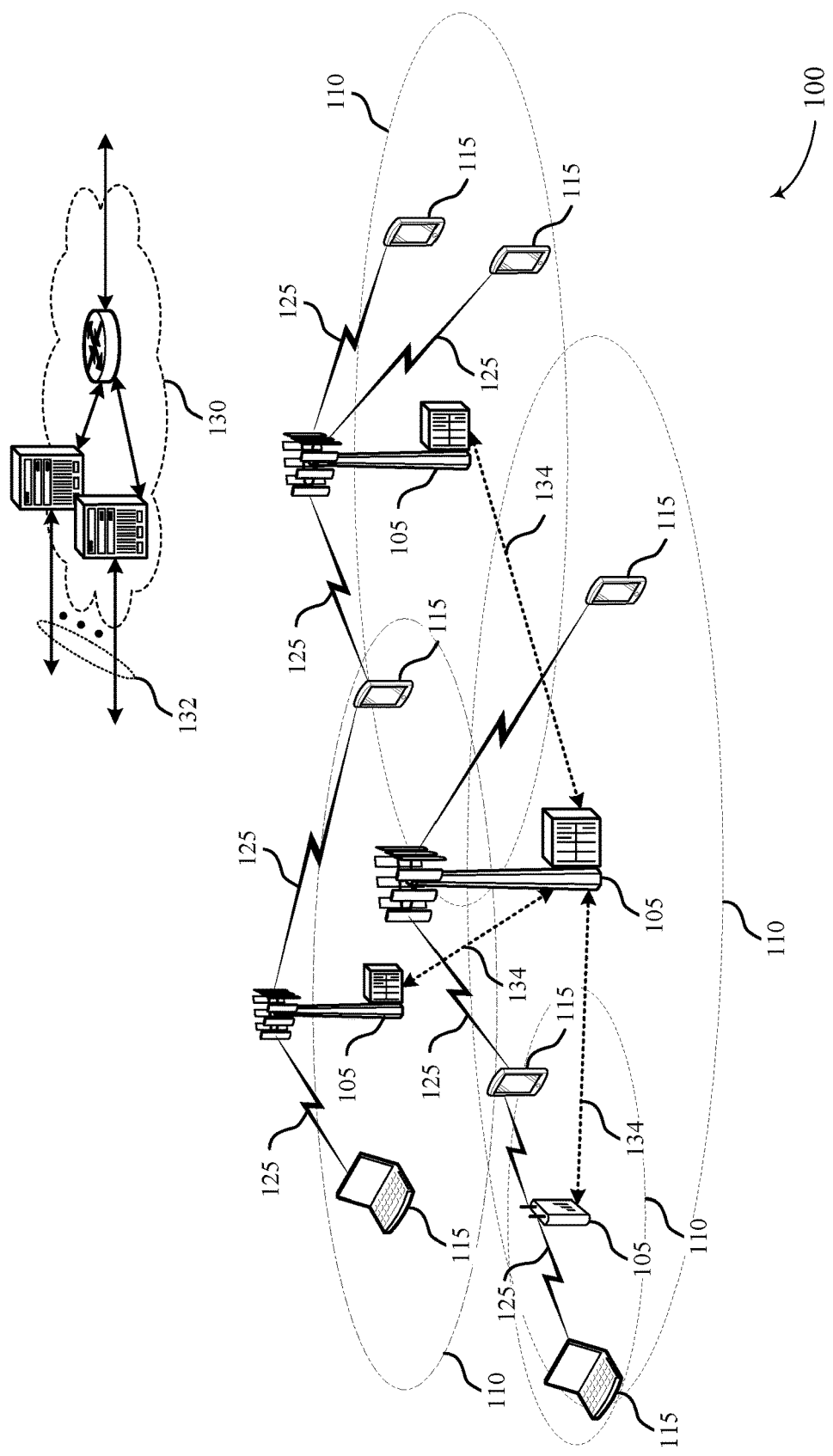
FIG. 1 illustrates an example of a system for wireless communication that supports RACH conveyance of DL synchronization beam information for various DL-UL correspondence states in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

During an initial access procedure, also referred to as a RACH procedure, UE 115 may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an UL resource grant, a timing advance and a temporary cell radio network temporary identity (C-RNTI). The UE 115 may then transmit an radio resource control (RRC) connection request, or RACH message 3, along with a temporary mobile subscriber identity (TMSI) (if the UE 115 has previously been connected to the same wireless network) or a random identifier. The radio resource control (RRC) connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) the UE 115 may repeat the RACH process by transmitting a new RACH preamble.

Wireless communication system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Specifically, wireless communication system 100 may operate in mmW frequency ranges, (e.g., 28 GHz, 40 GHz, 60 GHz, etc.). Wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device, such as a UE 115, may select a beam direction for communicating with a network by selecting the strongest beam from among a number of signals transmitted by a base station 105. In one example, the signals may be DL synchronization signals (e.g., primary or secondary synchronization signals) or DL reference signals (e.g., channel state information reference signals (CSI-RS)) transmitted from the base station 105 during discovery. The discovery procedure may be cell-specific, for example, may be directed in incremental directions around the coverage area 110 of the base station 105. The discovery procedure may be used, at least in certain aspects, to identify and select beam(s) to be used for beamformed transmissions between the base station 105 and a UE 115.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Wireless communication system 100 may be or include a multicarrier mmW wireless communication system. Broadly, aspects of wireless communication system 100 may include a UE 115 and a base station 105 configured to support RACH conveyance of DL synchronization beam information for various DL-UL correspondence states. For example, the base station 105 may transmit DL signal(s) on DL beam(s). The UE 115 may select a DL beam from the DL signal(s) that can be used for DL communications, (e.g., from the base station 105 to the UE 115). The UE 115 may select a resource and/or a RACH waveform for transmission of the RACH message to the base station 105, where the selection is based on the selected DL beam. The UE 115 may then transmit the RACH message to the base station 105 using the selected resource and/or RACH waveform. The base station 105 receives the RACH message on the selected resource and/or RACH waveform and uses the resource and/or RACH waveform to identify the selected DL beam. In one non-limiting example, the UE 115 may select a resource (e.g., channel) that corresponds to the timing feature of the DL synchronization signal(s) (e.g., symbol). The base station 105 may then use the selected DL beam for communications from the base station 105 to the UE 115, (e.g., for subsequent DL communications).

Figure 2:
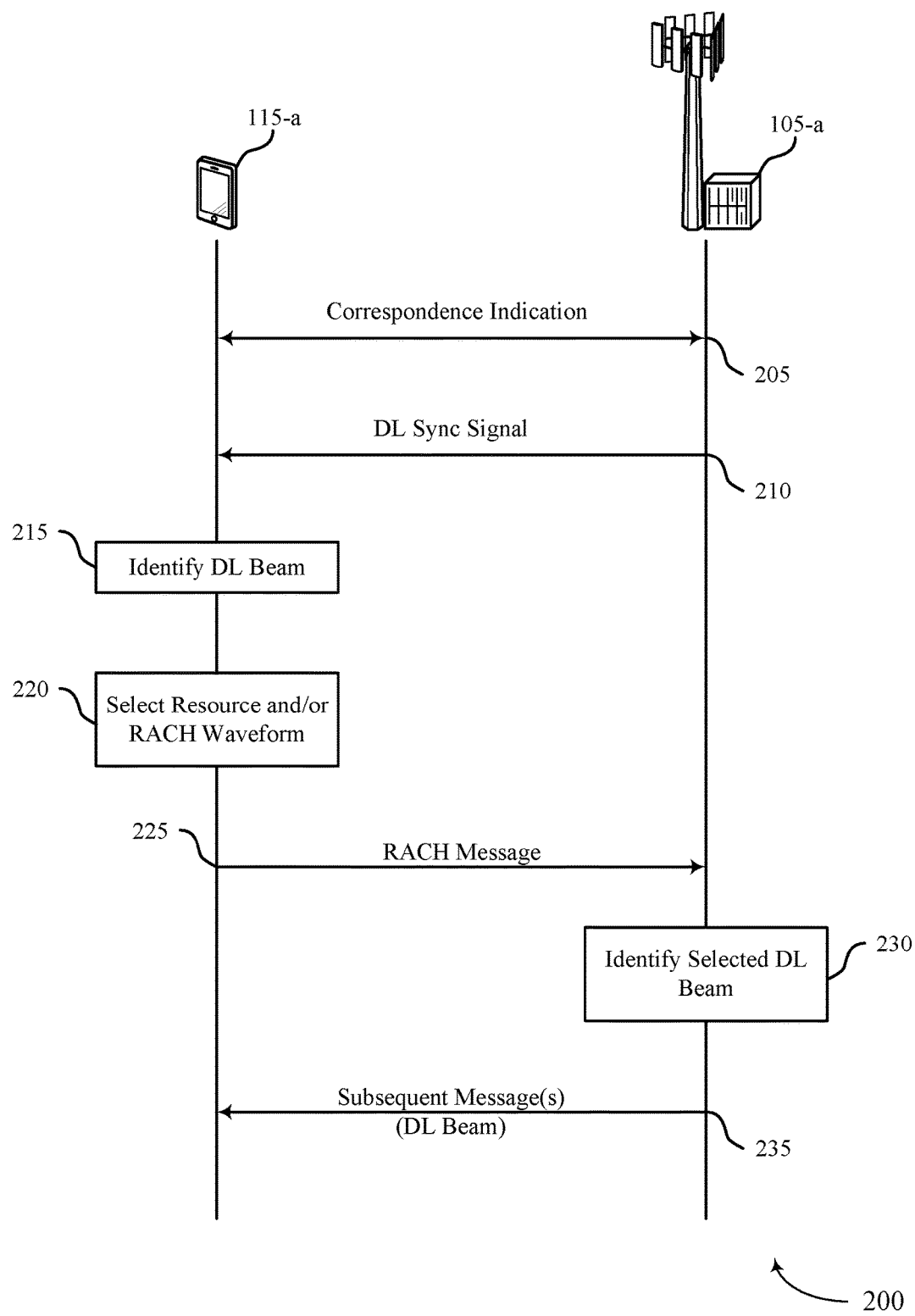
FIG. 2 illustrates an example of a process flow that supports RACH conveyance of DL synchronization beam information for various DL-UL correspondence states in accordance with aspects of the present disclosure.

FIG. 2 illustrates an example of a process flow 200 for RACH conveyance of DL synchronization beam information for various DL-UL correspondence states. Process flow 200 may implement aspects of wireless communication system 100 of FIG. 1. Process flow 200 may include a UE 115-*a* and a base station 105-*a*, which may be examples of the corresponding devices of FIG. 1. Base station 105-*a* may be a mmW base station and a serving base station for UE 115-*a*.

At 205, base station 105-*a* may transmit an indication of correspondence associated with DL beams at the base station side. In some aspects, the base station 105-*a* may explicitly indicate correspondence to UE 115-*a*. For example, a bit may be dedicated to conveying the correspondence indication. In other aspects, base station 105-*a* may implicitly indicate correspondence. For example, UE 115-*a* may deduce that correspondence is present or absent at base station 105-*a* from a mapping of DL beams to the RACH resources or waveform. In one example, if the DL beams and the RACH resources are configured using time division duplexing (TDD), then this may indicate that the base station 105-*a* may have correspondence.

In some cases, base station 105-*a* may include the indication of correspondence in a master information block (MIB) (e.g., bits reserved for indicating correspondence) or a system information block (SIB) (e.g., bits reserved for indicating correspondence) transmitted to UE 115-*a*. In some examples, the base station may transmit the MIB over a physical broadcast channel (PBCH), and the base station may transmit the SIB over an extended PBCH. In some examples, the indication may be based on a preamble format where one preamble format may convey an indication of no correspondence, a second preamble format may convey an indication of partial correspondence, and a third preamble format may convey and indication of full correspondence. Based on the indication of correspondence, UE 115-*a* may determine whether there is full correspondence, no correspondence, or partial correspondence (e.g., with uncertainty region 2*N+1, where N represents a number of subarrays at UE 115-*a* or with uncertainty 2*M+1, where M represents a number of beams transmitted by base station 105-*a*). If UE 115-*a* determines that correspondence is absent, UE 115-*a* may select a UL beam (e.g., for communication with base station 105-*a*) that is different from the DL beam used by base station 105-*a*.

Additionally or alternatively, at 205, UE 115-*a* may transmit an indication of correspondence associated with UL beams at the UE side. For example, UE 115-*a* may transmit a nature of correspondence between one or more receive DL synchronization beams at the UE and one or more transmit uplink (UL) beams at the UE, the indication of correspondence in a RACH message (e.g., RACH msg 1 or RACH msg 3) or over a physical uplink control channel (PUCCH) or a physical uplink shared channel (PUSCH). Base station 105-*a* may receive the indication of correspondence at the UE side and, based on the indication, base station 105-*a* may determine to map beams used to transmit channel state information reference signals (CSI-RSs) to beams used to transmit sounding reference signals (SRSs) or vice versa. Additionally, base station 105-*a* may determine to map beams used in DL beam training to beams used in UL beam training or vice versa based on the indication.

At 210, base station 105-*a* may transmit (and UE 115-0 may receive) a DL synchronization signal to UE 115-*a*. The DL synchronization signal may be a beamformed signal transmitted from base station 105-*a* on DL synchronization beam(s). The DL synchronization signal may be associated with an index and/or a symbol of a subframe. The DL synchronization signal may be associated with a transmit power condition.

In some aspects, base station 105-*a* transmits a plurality of DL synchronization signals during a synchronization subframe. Each DL synchronization signal may be transmitted in a symbol of the synchronization subframe, (e.g., DL synchronization signal 1 may be transmitted during symbol 1, Dl synchronization signal 2 may be transmitted during symbol 2, etc.).

At 215, UE 115-*a* may identify a selected DL beam of the DL synchronization beams to use for communications from base station 105-*a* to UE 115-*a*. UE 115-*a* may identify the selected DL beam by identifying a preferred DL beam based on a signal strength and/or a signal quality of the DL synchronization signal, (e.g., high received signal strength and/or low interference level). In some aspects, UE 115-*a* may identify the selected DL beam by identifying a transmit power condition of the DL synchronization signal on the DL synchronization beams, (e.g., a transmit power above a threshold level).

At 220, UE 115-*a* may select a resource and/or RACH waveform for transmission of the RACH message to base station 105-*a*. The resource and/or RACH waveform may be selected based, at least in certain aspects, on the selected DL beam, (e.g., based on the index of the selected DL beam, based on the symbol of a subframe of the DL synchronization signal of the selected DL beam, etc.). The resource and/or RACH waveform may be associated with tone(s) in a component carrier and/or associated with a component carrier.

At 225, UE 115-*a* may transmit a RACH message to base station 105-*a*. The RACH message may be transmitted on the selected RACH resource and/or RACH waveform. The RACH message may be transmitted during an entire duration of a corresponding random access subframe, for example, during each symbol of the random access subframe. In some aspects, the RACH message may be transmitted during an entire duration of a corresponding random access slot, subframe, occasion, burst, burst set, and the like. Generally, these terms may refer to a time duration where the gNB sweeps some or all of its receive beams to receive RACH message(s). In some aspects, UE 115-*a* may select a RACH waveform for transmission of the RACH message. The RACH waveform may be selected based on the selected DL beam and may include a RACH preamble, a cyclic shift, etc. In some aspects, UE 115-*a* may transmit the RACH message on a plurality of UL beams.

At 230, base station 105-*a* may identify the selected DL beam. Base station 105-*a* may identify the selected DL beam based on the resource and/or RACH waveform used for the RACH message transmission. In some aspects, base station 105-*a* may identify the selected DL beam by associating the resource and/or RACH waveform with an index of the selected DL beam. In some aspects, base station 105-*a* may identify the selected DL beam by associating the resource and/or RACH waveform with a symbol of a subframe of the DL synchronization signal of the selected DL beam.

In some aspects, base station 105-*a* may identify the selected DL beam based on the RACH waveform of the RACH message. For example, base station 105-*a* may identify the selected DL beam based on the RACH preamble of the RACH message, a cyclic shift of the RACH message, etc.

At 235, base station 105-*a* may transmit subsequent messages to UE 115-*a* using the selected DL beam. In some cases, the selected DL beam is a preferred DL beam. Moreover, in some aspects base station 105-*a* may use the RACH message received from UE 115-*a* to determine a selected UL beam for communications from UE 115-*a* to base station 105-*a*. For example, base station 105-*a* may measure a quality of the RACH message that is received on a plurality of UL beams and determine the selected UL beam based on the measured quality. Measuring the quality of the RACH message may include measuring a reference signal received power (RSRP), a received signal strength indicator (RSSI), a reference signal received quality (RSRQ), a signal to noise ratio (SNR), a signal to interference noise ratio (SINR), etc.

In some cases, UE 115-*a* may measure an RSRP of a received signal transmitted on a synchronization signal block (e.g., where a combination of one or more synchronization signals are transmitted together in a certain direction) to identify the best signal. In cases where UE 115-*a* is unable to determine a strongest port associated with a certain symbol, UE 115-*a* may indicate or convey a best SS block index or the preferred DL beam to base station 105-*a* using different spreading codes (e.g., orthogonal cover codes (OCCs)). In some examples, base station 105-*a* may transmit one or more additional reference signals (e.g., a beam reference signal (BRS), a mobility reference signal (MRS), etc.) inside symbols used for synchronization signals 205, and UE 115-*a* may identify a best transmission port (e.g., best downlink transmission beam ID). As a result, UE 115-*a* may feed back the best downlink transmission beam ID by using different spreading codes.

If base station 105-*a* does not have beam correspondence, base station 105-*a* may request UE 115-*a* transmit RACH in all symbols of the RACH slot. Base station 105-*a* may then find the best uplink reception beam based on the quality of received RACH signals. In some examples, when base station 105-*a* does not have transmit/reception beam correspondence, base station 105-*a* may configure an association between a downlink signal or downlink channel and a subset of RACH resources and/or a subset of preamble indices (e.g., RACH preamble indices), which may be used to determine a downlink transmission beam (e.g., for sending Msg2). Based on a downlink measurement of received signals and the corresponding association, UE 115-*a* may select the subset of RACH resources and/or the subset of RACH preamble indices. In such cases, a preamble index may comprise a preamble sequence index and an OCC index, such as in cases when OCC is supported. In some examples, a subset of preambles may be indicated by OCC indices.

In some aspects, correspondence may be absent between the DL synchronization beams from base station 105-*a* and UL beams from UE 115-*a*. Thus, in some examples the selected DL beam may be different from the selected UL beam. Aspects of the present disclosure may support partial or no beam correspondence between the DL transmission beams and the UL receive beams. In the case of partial correspondence, the RACH message transmitted at 225 may be transmitted over a transmission time with a center symbol corresponding to the best, (e.g., strongest received signal strength), DL synchronization beam or with a center symbol corresponding to the symbol associated with the best DL synchronization beam. Similarly, UE 115-*a* may determine the RACH preamble of the RACH message at 225 based on the best DL synchronization beam, and UE 115-*a* may determine the subcarrier region used for the transmission of the RACH message at 225 based on the best DL synchronization beam. This may apply to frequency division duplexing (FDD) system where full beam correspondence may not be present between the DL and UL. The amount of partial beam correspondence may vary from one scenario to the next. In some examples, the absent correspondence may be associated with different channel propagation characteristics for the DL and the UL beams, (e.g., different transmit power levels, different angle of departure and/or arrival, etc.).

In some cases, correspondence may be present at the base station 105-a. In this case, the base station 105-a may transmit different DL synchronization signals at different times, and the base station 105-a may receive the corresponding RACH resources simultaneously from UE 115-a through a digital receiver sub-system, which may not suffer from analog beam constraints. In this case, a base station 105-a may request that the UE 115-a map DL synchronization signals to the RACH resources or waveforms. The base station 105-a may then analyze each receive beam path with a RACH detector.

Aspects of the present disclosure may also support beam correspondence between the DL transmission beams and the UL receive beams. In the case that correspondence is present, the RACH message transmitted at 225 may be transmitted over a transmission time that corresponds to the best DL synchronization beam or the symbol corresponding to the best DL synchronization beam.

Figure 3:
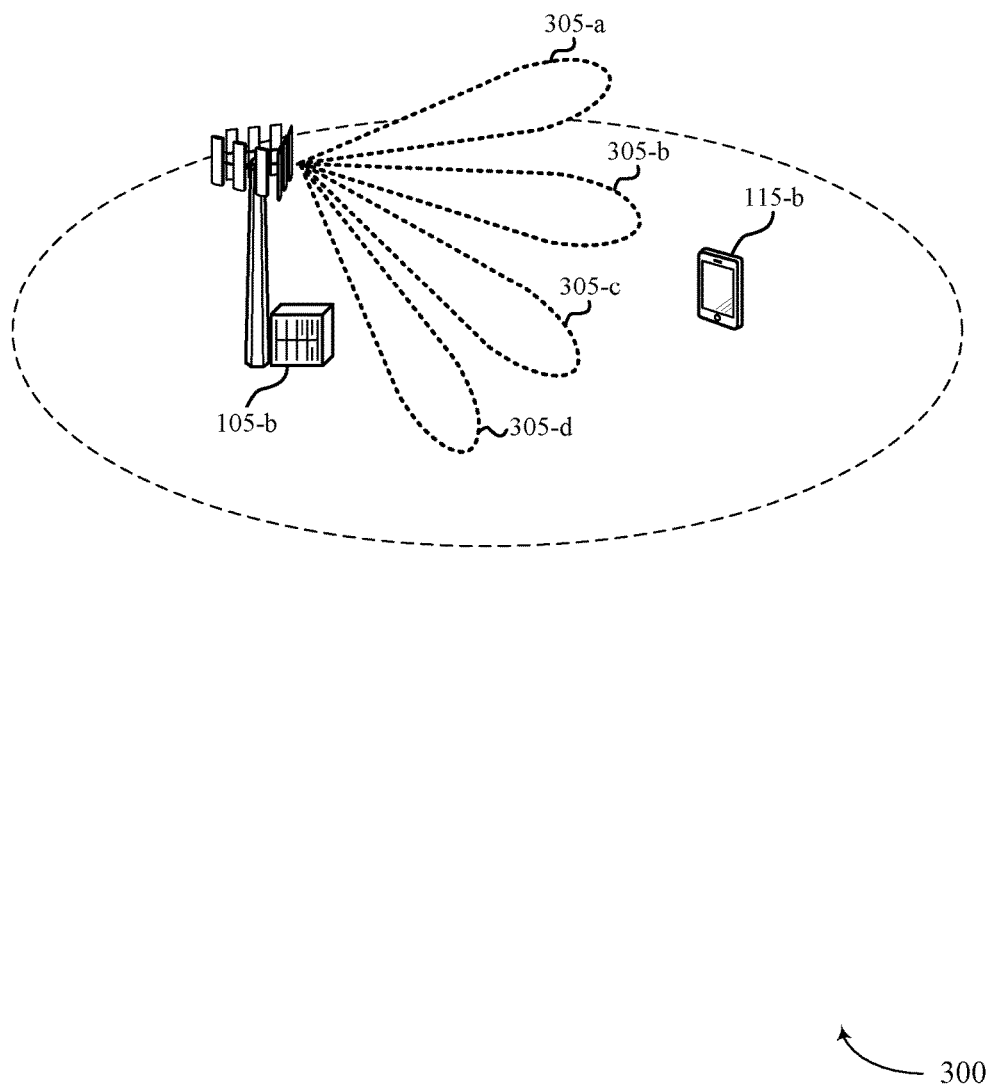
FIG. 3 illustrates an example of a system for wireless communication that supports RACH conveyance of DL synchronization beam information for various DL-UL correspondence states in accordance with aspects of the present disclosure.

FIG. 3 illustrates an example of a system 300 for wireless communications that supports RACH conveyance of DL synchronization beam information for various DL-UL correspondence states. System 300 may be an example of aspects of wireless communication system 100 of FIG. 1. System 300 may be a mmW wireless communication system. System 300 may include a UE 115-b and a base station 105-b, which may be examples of the corresponding devices of FIGS. 1 and 2. Broadly, system 300 illustrates aspects of a discovery procedure where UE 115-b discovers base station 105-b based on DL synchronization signals transmitted on DL synchronization beams.

In some examples, base station 105-b may be a mmW base station that transmits beamformed transmissions on an active beam to UE 115-b. The transmissions from base stations 105-b may be beamformed or directional transmissions that are directed towards UE 115-b.

For example, base station 105-b may transmit DL synchronization signal on DL synchronization beams 305. Base station 105-b may transmit DL synchronization signals (e.g., for random access) in a beamformed manner and swept through the angular coverage region (e.g., in azimuth and/or elevation). Each DL synchronization beam 305 may be transmitted in a beam sweeping operation in different directions so as to cover the coverage area of base station 105-b. For example, DL synchronization beam 305-a may be transmitted in a first direction, DL synchronization beam 305-b may be transmitted in a second direction, DL synchronization beam 305-c may be transmitted in a third direction, and DL synchronization beam 305-d may be transmitted in a fourth direction. Although system 300 shows four DL synchronization beams 305, it is to be understood that fewer and/or more DL synchronization beams 305 may be transmitted. Moreover, the DL synchronization beams 305 may be transmitted at differing beam widths, at different elevation angles, etc. In some aspects, DL synchronization beams 305 may be associated with a beam index, for example, an indicator identifying the beam.

In some aspects, DL synchronization beams 305 may also be transmitted during different symbol periods of a synchronization subframe. For example, DL synchronization beam 305-a may be transmitted during a first symbol period (e.g., symbol 0), DL synchronization beam 305-b may be transmitted during a second symbol period (e.g., symbol 1), DL synchronization beam 305-c may be transmitted during a third symbol period (e.g., symbol 2), and DL synchronization beam 305-d may be transmitted during a fourth symbol period (e.g., symbol 3). Additional DL synchronization beams 305 may be transmitted during other symbol periods of the synchronization subframe.

Generally, performing the beam sweeping operation supports base station 105-b determining which direction UE 115-b is located (e.g., after receiving response messages from UE 115-b). This supports transmission of RACH message 2 from base station 105-b. Moreover, the beam sweeping operation improves communications when correspondence does not hold between DL and UL channels, UE 115-b may select the frequency region and/or the waveform configuration (e.g., resource and/or RACH waveform) for transmitting the random access signal (e.g., RACH message, RACH msg1, or RACH msg3) based on the index of the best or preferred DL synchronization signal on the DL synchronization beam 305. In some cases, UE 115-a may convey the best or preferred DL beam using an index or identification in a RACH msg1. During the random access period, base station 105-a may find the suitable UL beam by receiving the random access signal in a sweeping manner. Base station 105-b may identify the UE 115-a selected DL beam from the resource and/or RACH waveform used (e.g., the used frequency region and/or waveform configuration) that contains the RACH message (e.g., RACH msg1 or RACH msg3) of the random access signal.

Thus, UEs within the coverage area of base station 105-b may receive the DL synchronization signals on DL synchronization beams 305. The UE 115-b may identify which DL synchronization signal is best, (e.g., strongest received signal strength, best channel quality, etc.), and identify this as the selected DL beam. UE 115-b may then select a resource and/or RACH waveform to use for transmission of the RACH message based on the selected DL beam, for example the preferred DL beam. In one example, the resource and/or RACH waveform used for the transmission of the RACH message may correspond to the symbol of the selected DL beam. In another example, the RACH message may include an identification or index of the preferred DL beam.

As one non-limiting example, there may be 16 different DL beams available. Thus, UE 115-b may use four bits to convey the DL beam information to base station 105-b. There may be four subcarrier regions (e.g., resources) and four different RACH waveforms available for use by UE 115-b. Accordingly, UE 115-b may transmit the four bits by selecting one out of four different RACH waveforms and one out of four subcarriers. Thus, UE 115-b may select a combination of the resource and the RACH waveform to transmit the RACH message to base station 105-b.

Thus, in certain aspects system 300 may support UE 115-b selecting a combination of a RACH waveform and/or the resource used for its RACH message transmission based on one or more combinations of the index of a DL synchronization beam or a symbol of the DL synchronization subframe. UE 115-b may transmit random access signal (e.g., RACH message, RACH msg1 or RACH msg3) during the entire duration of the random access subframe and/or during a portion of the random access subframe.

In some aspects, base station 105-b may determine the selected DL beam of UE 115-b from the used frequency region and/or RACH waveform that contains the message 1 of random access signal. Base station 105-b may determine the best UL receive beam by measuring the quality of the received signal at different uplink receiver beams. The signal quality may denote one or more combinations of RSRP, RSSI, RSRQ, SNR, SINR, etc.

In some aspects, UE 115-*b* may select the best DL synchronization signal and the frequency region of RACH and/or RACH waveform based on the index of the best DL synchronization signal. UE 115-*b* may select a DL synchronization beam 305 that satisfies a transmit power condition. UE 115-*b* may select a RACH preamble and cyclic shift partially based on the index of a DL synchronization beam 305.

The absence of correspondence may indicate that the best DL beam and the best UL beam are not same.

In some aspects, UE 115-*b* may select a combination of RACH and the resource used for its transmission based on a symbol of the DL synchronization subframe if the base station 105-*b* transmits multiple beams using multiple antenna ports in each symbol of the synchronization subframe. In some aspects, the resource may denote the tones in a component carrier and/or a component carrier.

Although the example described with reference to FIG. 3 is directed to transmitting RACH message in a RACH subframe, this example is also applicable to transmitting a scheduling request message, beam recovery message, or beam tracking message in a RACH subframe. In some cases, UE 115 may find that the best synchronization beam was transmitted during a specific symbol, and UE 115 may transmit a scheduling request message, beam recovery message, or beam tracking message in a frequency region that corresponds to the specific symbol. The frequency region may be in a different resource (or resource block) in a RACH subframe. That is, a first portion of the resources in a RACH subframe may be allocated for RACH message transmissions, a second portion of the resources in a RACH subframe may be allocated for scheduling request message transmissions, and a third portion of the resources in a RACH subframe may be allocated for beam recovery or beam tracking message transmissions.

UE 115-*b* may receive an indication of the subcarrier region for a scheduling request message transmission or a beam recovery or beam tracking message transmission through RRC signaling. In some cases, there may be eight (8) possible subcarrier regions. UE 115-*b* may also receive the desired cyclic shift for the scheduling request message transmission or the beam recovery or beam tracking message transmission through RRC signaling. In some examples, UE 115-*b* may use twelve (12) different cyclic shifts to generate a sequence for the scheduling request message transmission or the beam recovery or beam tracking message transmission. The number of available cyclic shifts for the scheduling request message transmission or the beam recovery or beam tracking message transmission may be greater than the number of available cyclic shifts for a RACH message transmission, since a timing error may be corrected before UE 115-*b* transmits the scheduling request message transmission or the beam recovery or beam tracking message. Further, the transmission of the scheduling request message transmission or the beam recovery or beam tracking message may span two (2) symbols which may provide additional degrees of freedom (e.g., 192 degrees of freedom in each symbol pair).

Figure 4A:
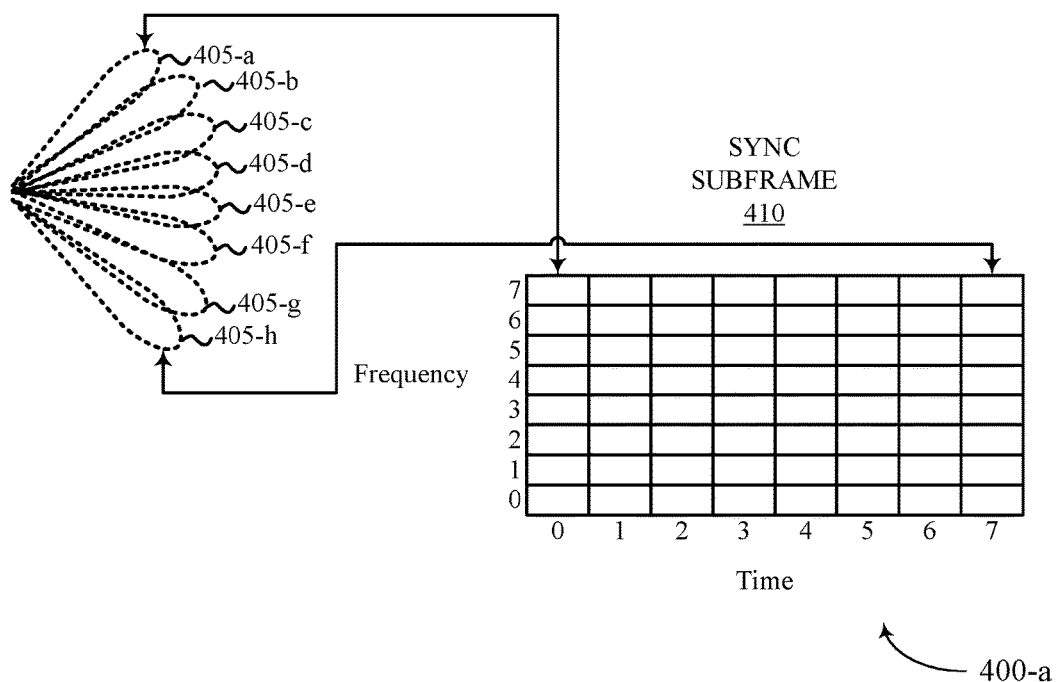
FIGS. 4A and 4B illustrate examples of aspects of a beam-subframe mapping configuration that supports RACH conveyance of DL synchronization beam information for various DL-UL correspondence states in accordance with aspects of the present disclosure.
Figure 4B:
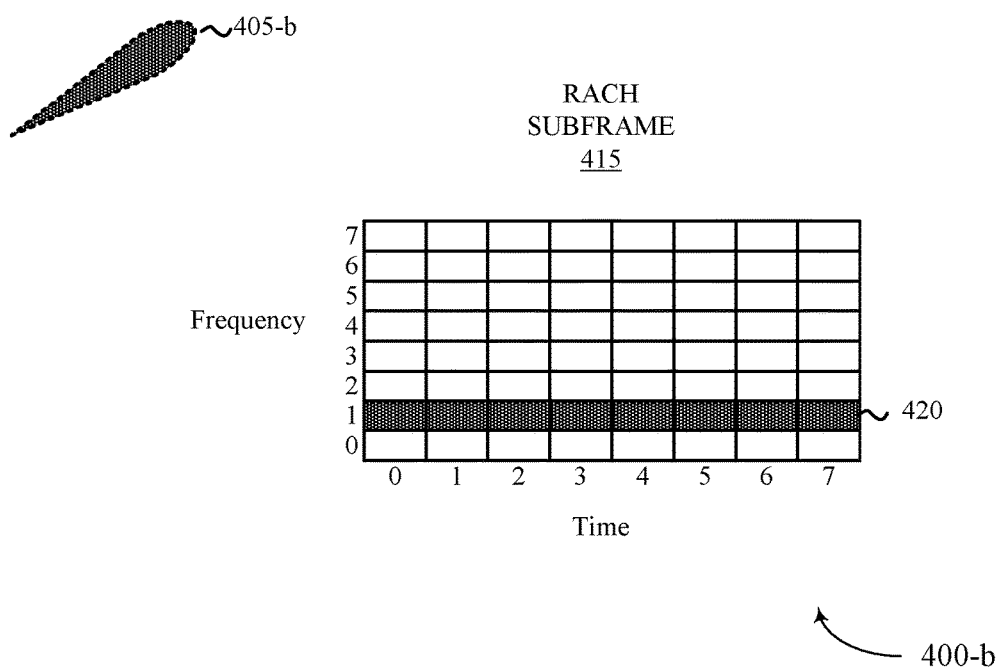

FIGS. 4A and 4B illustrate examples of a beam-subframe mapping configuration 400 for RACH conveyance of DL synchronization beam information for various DL-UL correspondence states. Configuration 400 may implement aspects of wireless communication system 100, process flow 200 and/or system 300 if FIGS. 1 through 3. In some aspects, aspects of configuration 400 may be implemented by a base station 105 and/or a UE 115, as is described with reference to FIGS. 1 through 3.

With reference to FIG. 4A, beam-subframe mapping configuration 400 may include a plurality of DL synchronization signals transmitted on DL synchronization beams 405. A base station 105 may transmit DL synchronization signals (e.g., for random access) in a beamformed manner and swept through the angular coverage region (e.g., in azimuth and/or elevation). Each DL synchronization beam 405 may be transmitted in a beam sweeping operation in different directions to cover the coverage area of base station 105. For example, DL synchronization beam 405-*a* may be transmitted in a first direction, DL synchronization beam 405-*b* may be transmitted in a second direction, and so on. In some aspects, DL synchronization beams 405 may be associated with a beam index, for example, an indicator identifying the beam.

In some aspects, DL synchronization beams 405 may also be transmitted during different symbol periods of a synchronization subframe 410. The synchronization subframe 410 may be associated with a time feature along the horizontal axis (e.g., symbols) and with a frequency feature along the vertical axis (e.g., frequencies or tones). For example, DL synchronization beam 405-*a* may be transmitted during a first symbol period (e.g., symbol 0), DL synchronization beam 405-*b* may be transmitted during a second symbol period (e.g., symbol 1), and so on until DL synchronization beam 405-*h* is transmitted during an eighth symbol period (e.g., symbol 7).

In some aspects, each DL synchronization signal transmitted on a DL synchronization beam 405 may be transmitted on some or all of the frequencies during the symbol. For example, DL synchronization beam 405-*a* may be transmitted on frequency or tones 0-7 during symbol 0, DL synchronization beam 405-*b* may be transmitted on frequency or tones 0-7 during symbol 1, and so on.

Thus, base station 105 may sweep DL synchronization beams 405 in eight directions during eight symbols of the synchronization subframe 410.

With reference to FIG. 4B, UEs 115 within the coverage area of base station 105 may receive the DL synchronization signals on DL synchronization beams 405. The UE 115 may identify which DL synchronization signal is best, (e.g., strongest received signal strength, best channel quality, etc.), and identify this as the selected DL beam. In the example FIG. 4B, the UE 115 has identified DL synchronization signal transmitted on DL synchronization beam 405-*b* as the selected DL beam. As indicated, DL synchronization beam 405-*b* was transmitted during the second symbol.

In some aspects, UE 115 may then select a resource to use for transmission of the RACH message based on the selected DL beam and during the RACH subframe 415. In one example, the resource used for the transmission of the RACH message may correspond to the symbol of the selected DL beam. Thus, UE 115 may select the second resource 420 (e.g., frequency or tone 1) as the resource for transmission of the RACH message. That is, UE 115 may select to the second resource 420 to convey an indication of the DL synchronization beam transmitted during the second symbol as being the selected DL beam. As discussed above, UE 115 may also select a RACH waveform to transmit the RACH message.

Thus, UE 115 may find that the best synchronization beam was transmitted during the second symbol. UE 115 may transmit a RACH message in the second frequency region for all time slots (e.g., during all symbols of the RACH subframe 415). Base station 105 may find the best DL transmit beam from the used frequency region (e.g., second resource 420) of the random access signal (e.g., RACH message). In some examples, the RACH message transmission time units may be greater than the synchronization subframe time units due to DL-UL power differences, for example.

In some aspects, base station 105 may sweep the same eight directions during the same eight symbols during the RACH subframe 415. For example, base station 105 may configure one or more antenna arrays to receive the RACH message according to the same sweeping patter used to transmit the DL synchronization signal on the DL synchronization beams 405 during the RACH subframe 415.

The example described above with reference to FIG. 4 may apply to cases when there is no correspondence at the base station 105 for the selected DL beam. Additionally, the example may apply to cases when there is no correspondence at both base station 105 and UE 115. In such cases, UE 115 may identify a method to transmit using the selected DL beam based on a link gain associated with transmissions from UE 115. In some cases, UE 115 may determine its link gain based on synchronization signals received from base station 105. If UE 115 has a sufficient link gain to satisfy a link budget, UE 115 may transmit the RACH message in a single RACH subframe. However, if UE 115 does not have sufficient link gain to satisfy a link budget, UE 115 may transmit the RACH message in multiple RACH subframes.

Although the example described with reference to FIGS. 4A and 4B is directed to transmitting RACH message in RACH subframe 415, this example is also applicable to transmitting a scheduling request message, beam recovery message, or beam tracking message in RACH subframe 415. In some cases, UE 115 may find that the best synchronization beam was transmitted during the second symbol, and UE 115 may transmit a scheduling request message, beam recovery message, or beam tracking message in a second frequency region for all time slots. The second frequency region may be in a different resource (or resource block) in RACH subframe 415. That is, a first portion of the resources in RACH subframe 415 may be allocated for RACH message transmissions, a second portion of the resources in RACH subframe 415 may be allocated for scheduling request message transmissions, and a third portion of the resources in RACH subframe 415 may be allocated for beam recovery or beam tracking message transmissions.

Figure 5A:
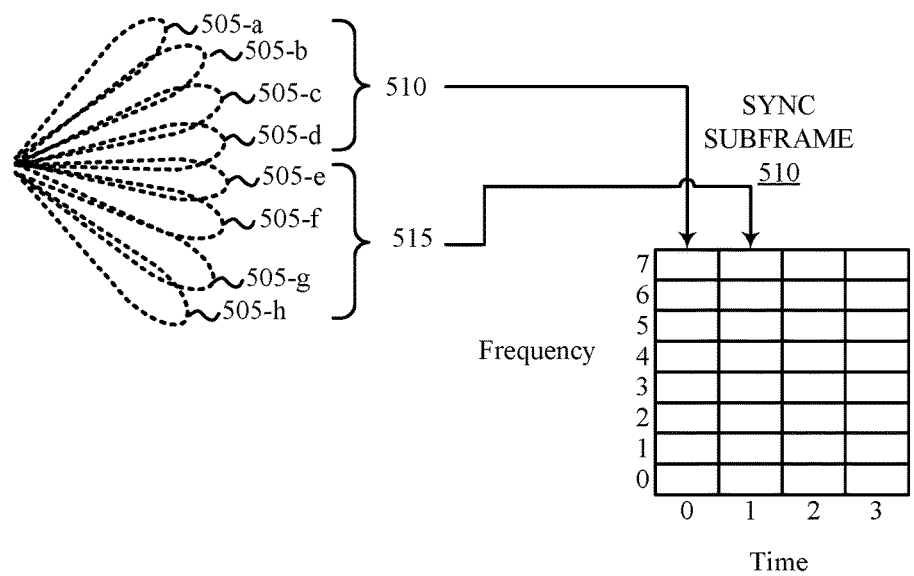
FIGS. 5A and 5B illustrate examples of a beam-subframe mapping configuration that supports RACH conveyance of DL synchronization beam information for various DL-UL correspondence states in accordance with aspects of the present disclosure.
Figure 5B:
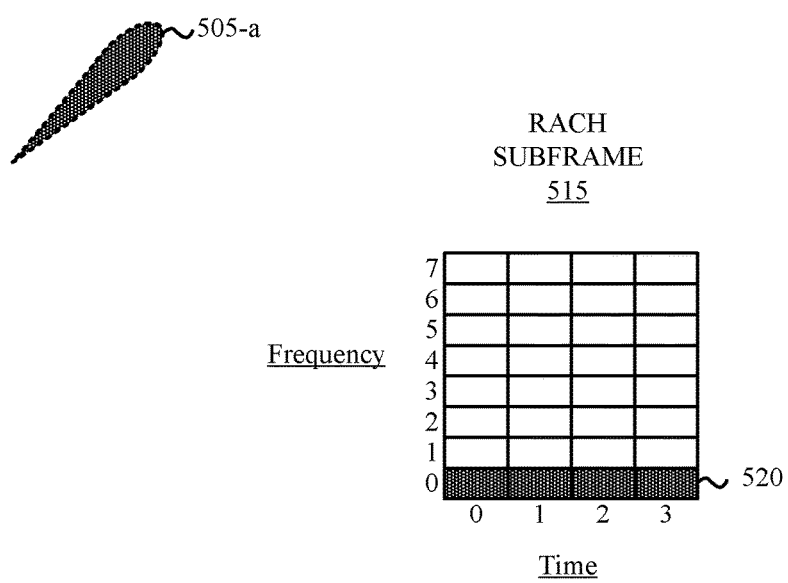

FIGS. 5A and 5B illustrate an example of a beam-subframe mapping configuration 500 for RACH conveyance of DL synchronization beam information for various DL-UL correspondence states. Configuration 500 may implement aspects of wireless communication system 100, process flow 200 and/or system 300 of FIGS. 1 through 3. In some aspects, aspects of configuration 500 may be implemented by a base station 105 and/or a UE 115, as is described with reference to FIGS. 1 through 3.

With reference to FIG. 5A, beam-subframe mapping configuration 500 may include a plurality of DL synchronization signals transmitted on DL synchronization beams 505. A base station 105 may transmit DL synchronization signals (e.g., for random access) in a beamformed manner and swept through the angular coverage region (e.g., in azimuth and/or elevation). Each DL synchronization beam 505 may be transmitted in a beam sweeping operation in different direction so as to cover the coverage area of base station 105. For example, DL synchronization beam 505-a may be transmitted in a first direction, DL synchronization beam 505-b may be transmitted in a second direction, and so on. In some aspects, DL synchronization beams 505 may be associated with a beam index, for example, an indicator identifying the beam.

In some aspects, DL synchronization beams 505 may also be transmitted during different symbol periods of a synchronization subframe 510. The synchronization subframe 510 may be associated with a time feature along the horizontal axis (e.g., symbols) and with a frequency feature along the vertical axis (e.g., frequencies or tones). In the example FIG. 5A, base station 105 may be configured with four antenna arrays where base station 105 sweeps four directions in each symbol. For example, antenna ports 0-3 may be grouped into subgroup 510 and used to transmit DL synchronization beams 505-a through 505-d during the first symbol (e.g., symbol 0) of the synchronization subframe 510. Also, antenna ports 0-3 may be grouped into subgroup 515 and used to transmit DL synchronization beams 505-e through 505-h during the second symbol (e.g., symbol 1) of the synchronization subframe 510. Thus, base station 105 may sweep eight directions during two symbols of the synchronization subframe 510.

In some aspects, each DL synchronization signal transmitted on a DL synchronization beam 505 may be transmitted on some or all of the frequencies during the symbol. For example, DL synchronization beam 505-a may be transmitted on any of frequency or tones 0-7 during symbol 0, DL synchronization beam 505-b may be transmitted on any of frequency or tones 0-7 during symbol 1, and so on. In some aspects, the DL synchronization beams 505 transmitted during a symbol may not be transmitted on overlapping frequencies.

Thus, base station 105 may sweep DL synchronization beams 505 in eight directions during eight symbols of the synchronization subframe 510.

With reference to FIG. 5B, UEs 115 within the coverage area of base station 105 may receive the DL synchronization signals on DL synchronization beams 505. The UE 115 may identify which DL synchronization signal is best, (e.g., strongest received signal strength, best channel quality, etc.), and identify this as the selected DL beam. In the example FIG. 5B, the UE 115 has identified DL synchronization signal transmitted on DL synchronization beam 505-a as the selected DL beam. As indicated, DL synchronization beam 505-a was transmitted during the first symbol (e.g., during symbol 0).

In some aspects, UE 115 may then select a resource to use for transmission of the RACH message based on the selected DL beam and during the RACH subframe 515. In one example, the resource used for the transmission of the RACH message may correspond to the symbol of the selected DL beam. Thus, UE 115 may select the first resource 520 (e.g., frequency or tone 0) as the resource for transmission of the RACH message. That is, UE 115 may select to the first resource 520 to convey an indication of the DL synchronization beam transmitted during the first symbol as being the selected DL beam.

Thus, UE 115 may find that the best synchronization beam was transmitted during the first symbol. UE 115 may transmit a RACH message in the first frequency region for all time slots (e.g., during all symbols of the RACH subframe 515). Base station 105 may find the best UL received beam by measuring the quality of the received signal during different time slots (e.g., during different symbols). In some aspects, base station 105 may find the best course DL beam from the used frequency region (e.g., first resource 520) of the random access signal (e.g., RACH message).

In some aspects, base station 105 may sweep the same eight directions during the same eight symbols during the RACH subframe 515. For example, base station 105 may configure one or more antenna arrays to receive the RACH message according to the same sweeping patter used to transmit the DL synchronization signal on the DL synchronization beams 505 during the synchronization subframe 510.

Figure 6A:
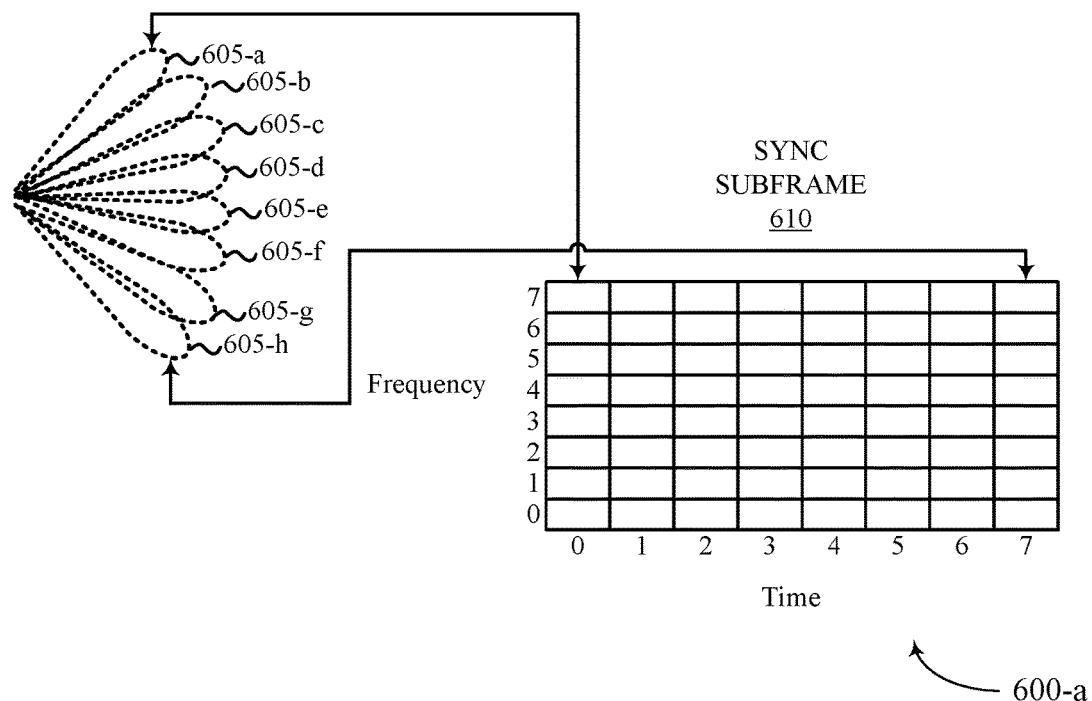
FIGS. 6A and 6B illustrate examples of a beam-subframe mapping configuration that supports RACH conveyance of DL synchronization beam information for various DL-UL correspondence states in accordance with aspects of the present disclosure.
Figure 6B:
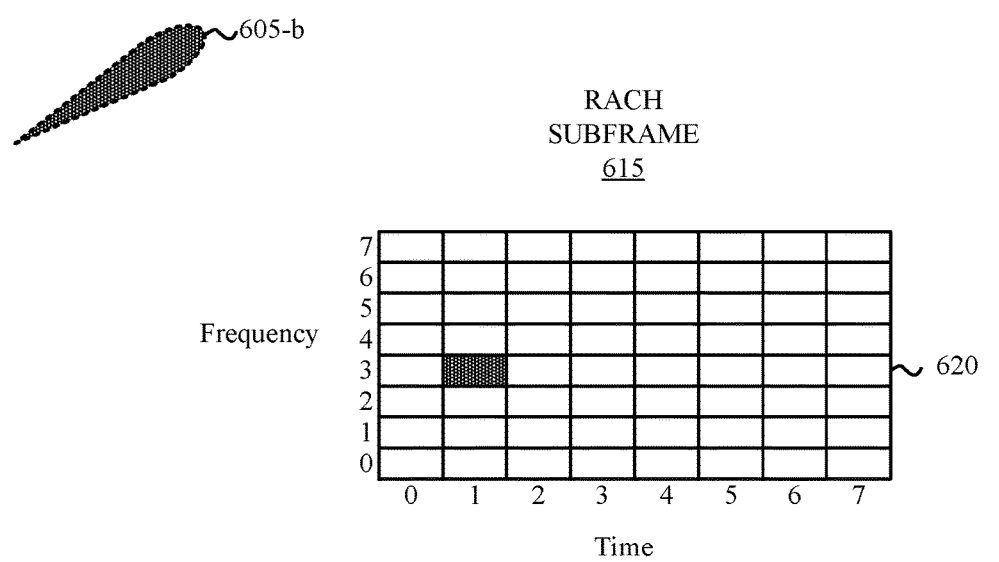

FIGS. 6A and 6B illustrate examples of a beam-subframe mapping configuration 600 for RACH conveyance of DL synchronization beam information for various DL-UL correspondence states. Configuration 600 may implement aspects of wireless communication system 100, process flow 200 and/or system 300 if FIGS. 1 through 3. In some aspects, aspects of configuration 600 may be implemented by a base station 105 and/or a UE 115, as is described with reference to FIGS. 1 through 3.

With reference to FIG. 6A, beam-subframe mapping configuration 600 may include a plurality of DL synchronization signals transmitted on DL synchronization beams 605. A base station 105 may transmit DL synchronization signals (e.g., for random access) in a beamformed manner and swept through the angular coverage region (e.g., in azimuth and/or elevation). Each DL synchronization beam 605 may be transmitted in a beam sweeping operation in different directions to cover the coverage area of base station 105. For example, DL synchronization beam 605-*a* may be transmitted in a first direction, DL synchronization beam 605-*b* may be transmitted in a second direction, and so on. In some aspects, DL synchronization beams 605 may be associated with a beam index, (e.g., an indicator identifying the beam).

In some aspects, DL synchronization beams 605 may also be transmitted during different symbol periods of a synchronization subframe 610. The synchronization subframe 610 may be associated with a time feature along the horizontal axis (e.g., symbols) and with a frequency feature along the vertical axis (e.g., frequencies or tones). For example, DL synchronization beam 605-*a* may be transmitted during a first symbol period (e.g., symbol 0), DL synchronization beam 605-*b* may be transmitted during a second symbol period (e.g., symbol 1), and so on until DL synchronization beam 605-*h* is transmitted during an eighth symbol period (e.g., symbol 7).

In some aspects, each DL synchronization signal transmitted on a DL synchronization beam 605 may be transmitted on some or all of the frequencies during the symbol. For example, DL synchronization beam 605-*a* may be transmitted on frequency or tones 0-7 during symbol 0, DL synchronization beam 605-*b* may be transmitted on frequency or tones 0-7 during symbol 1, and so on.

Thus, base station 105 may sweep DL synchronization beams 605 in eight directions during eight symbols of the synchronization subframe 610.

With reference to FIG. 6B, UEs 115 within the coverage area of base station 105 may receive the DL synchronization signals on DL synchronization beams 605. The UE 115 may identify which DL synchronization signal is best, (e.g., strongest received signal strength, best channel quality, etc.), and identify this as the selected DL beam. In the example FIG. 6B, the UE 115 has identified DL synchronization signal transmitted on DL synchronization beam 605-*b* as the selected DL beam. As indicated, DL synchronization beam 605-*b* was transmitted during the second symbol.

In some aspects, DL synchronization beam 605-*b* may have full correspondence at base station 105 and UE 115. That is, the DL synchronization beam 605-*b* may be used for transmission and reception at both base station 105 and UE 115. Thus, UE 115 may select the DL synchronization beam 605-*b* to transmit a RACH message to base station 105. In some cases, UE 115 may randomly select the subcarrier region for transmission of the RACH message to provide diversity in the presence of multiple UEs. In the example FIG. 6B, the UE 115 has selected subcarrier 3 for the transmission of the RACH message.

In other aspects, DL synchronization beam 605-*b* may have full correspondence at base station 105 and no correspondence at UE 115. That is, the DL synchronization beam 605-*b* may be used for transmission and reception at base station 105, but a transmission from UE 115 on DL synchronization beam 605-*b* may be noisy. In such cases, UE 115 may identify a method to transmit using the selected DL beam based on a link gain associated with transmissions from UE 115. In some cases, UE 115 may determine its link gain based on synchronization signals received from base station 105. If UE 115 has a sufficient link gain to satisfy a link budget, UE 115 may transmit the RACH message in a single RACH subframe. However, if UE 115 does not have sufficient link gain to satisfy a link budget, UE 115 may transmit the RACH message in multiple RACH subframes.

Although the example described with reference to FIGS. 6A and 6B is directed to transmitting RACH message in RACH subframe 615, this example is also applicable to transmitting a scheduling request message, beam recovery message, or beam tracking message in RACH subframe 615. In some cases, UE 115 may find that the best synchronization beam was transmitted during the second symbol, and UE 115 may transmit a scheduling request message, beam recovery message, or beam tracking message in a second frequency region for all time slots. The second frequency region may be in a different resource (or resource block) in the second symbol. That is, a first portion of the resources in RACH subframe 615 may be allocated for RACH message transmissions, a second portion of the resources in RACH subframe 615 may be allocated for scheduling request message transmissions, and/or a third portion of the resources in RACH subframe 615 may be allocated for beam recovery or beam tracking message transmissions.

Figure 7A:
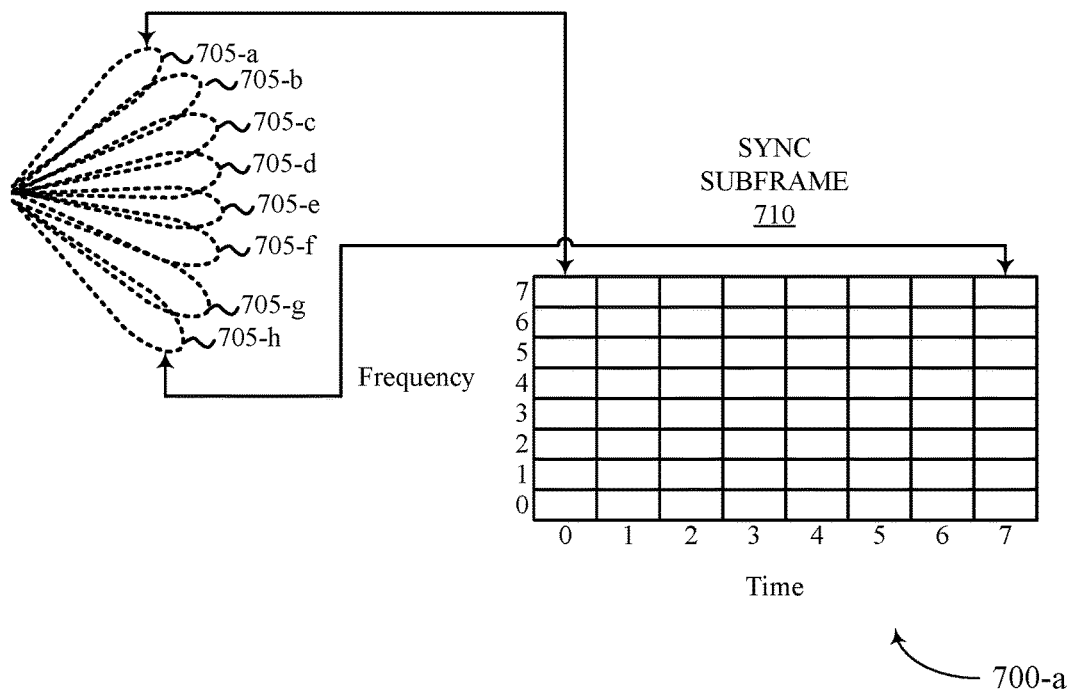
FIGS. 7A and 7B illustrate examples of a beam-subframe mapping configuration that supports RACH conveyance of DL synchronization beam information for various DL-UL correspondence states in accordance with aspects of the present disclosure.
Figure 7B:
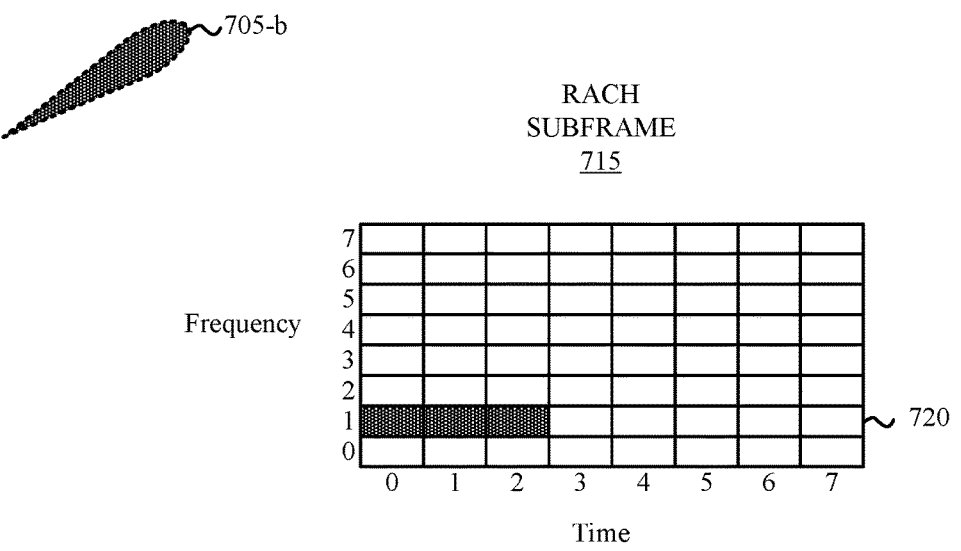

FIGS. 7A and 7B illustrate examples of a beam-subframe mapping configuration 700 for RACH conveyance of DL synchronization beam information for various DL-UL correspondence states. Configuration 700 may implement aspects of wireless communication system 100, process flow 200 and/or system 300 if FIGS. 1 through 3. In some aspects, aspects of configuration 700 may be implemented by a base station 105 and/or a UE 115, as is described with reference to FIGS. 1 through 3.

With reference to FIG. 7A, beam-subframe mapping configuration 700 may include a plurality of DL synchronization signals transmitted on DL synchronization beams 705. A base station 105 may transmit DL synchronization signals (e.g., for random access) in a beamformed manner and swept through the angular coverage region (e.g., in azimuth and/or elevation). Each DL synchronization beam 705 may be transmitted in a beam sweeping operation in different directions to cover the coverage area of base station 105. For example, DL synchronization beam 705-*a* may be transmitted in a first direction, DL synchronization beam 705-*b* may be transmitted in a second direction, and so on. In some aspects, DL synchronization beams 705 may be associated with a beam index, for example, an indicator identifying the beam.

In some aspects, DL synchronization beams 705 may also be transmitted during different symbol periods of a synchronization subframe 710. The synchronization subframe 710 may be associated with a time feature along the horizontal axis (e.g., symbols) and with a frequency feature along the vertical axis (e.g., frequencies or tones). For example, DL synchronization beam 705-a may be transmitted during a first symbol period (e.g., symbol 0), DL synchronization beam 705-b may be transmitted during a second symbol period (e.g., symbol 1), and so on until DL synchronization beam 705-h is transmitted during an eighth symbol period (e.g., symbol 7).

In some aspects, each DL synchronization signal transmitted on a DL synchronization beam 705 may be transmitted on some or all of the frequencies during the symbol. For example, DL synchronization beam 705-a may be transmitted on frequency or tones 0-7 during symbol 0, DL synchronization beam 705-b may be transmitted on frequency or tones 0-7 during symbol 1, and so on.

Thus, base station 105 may sweep DL synchronization beams 705 in eight directions during eight symbols of the synchronization subframe 710.

With reference to FIG. 7B, UEs 115 within the coverage area of base station 105 may receive the DL synchronization signals on DL synchronization beams 705. The UE 115 may identify which DL synchronization signal is best, (e.g., strongest received signal strength, best channel quality, etc.), and identify this as the selected DL beam. In the example FIG. 7B, the UE 115 has identified DL synchronization signal transmitted on DL synchronization beam 705-b as the selected DL beam. As indicated, DL synchronization beam 705-b was transmitted during the second symbol.

In some aspects, DL synchronization beam 705-b may have partial correspondence at base station 105 and UE 115. That is, the DL synchronization beam 705-b may be used for transmission and reception at both base station 105 and UE 115 with little noise. However, it may be desirable for UE 115 to identify a better beam (e.g., stronger signal strength) for uplink transmission. Thus, UE 115 may transmit the RACH message on the symbol of the selected DL beam and symbols of adjacent DL beams (e.g., DL synchronization beams 705-a and 705-c). In order to receive the uplink transmission, base station 105 may sweep a portion of the eight directions during symbols 0, 1, and 2 in the RACH subframe 715.

UE 115 may then select a resource to use for transmission of the RACH message based on the selected DL beam and during the RACH subframe 415. In one example, the resource used for the transmission of the RACH message may correspond to the symbol of the selected DL beam. Thus, UE 115 may select the second resource 720 (e.g., frequency or tone 1) as the resource for transmission of the RACH message. That is, UE 115 may select the second resource 720 to convey an indication of the DL synchronization beam transmitted during the second symbol as being the selected DL beam. As discussed above, UE 115 may also select a RACH waveform to transmit the RACH message.

Thus, UE 115 may find that the best synchronization beam was transmitted during the second symbol. UE 115 may transmit a RACH message in the second frequency region for a portion of the time slots (e.g., during a portion of the symbols of the RACH subframe 715). Base station 105 may find the best DL transmit beam from the used frequency region (e.g., second resource 720) of the random access signal (e.g., RACH message). In some examples, the RACH message transmission time units may be greater than the synchronization subframe time units due to DL-UL power differences, for example.

Although the example described with reference to FIGS. 7A and 7B is directed to transmitting RACH message in RACH subframe 715, this example is also applicable to transmitting a scheduling request message, beam recovery message, or beam tracking message in RACH subframe 715.

In some cases, UE 115 may find that the best synchronization beam was transmitted during the second symbol, and UE 115 may transmit a scheduling request message, beam recovery message, or beam tracking message in a second frequency region for a portion of the symbols. The second frequency region may be in a different resource (or resource block) in RACH subframe 715. That is, a first portion of the resources in RACH subframe 715 may be allocated for RACH message transmissions, a second portion of the resources in RACH subframe 715 may be allocated for scheduling request message transmissions, and/or a third portion of the resources in RACH subframe 715 may be allocated for beam recovery or beam tracking message transmissions.

Figure 8:
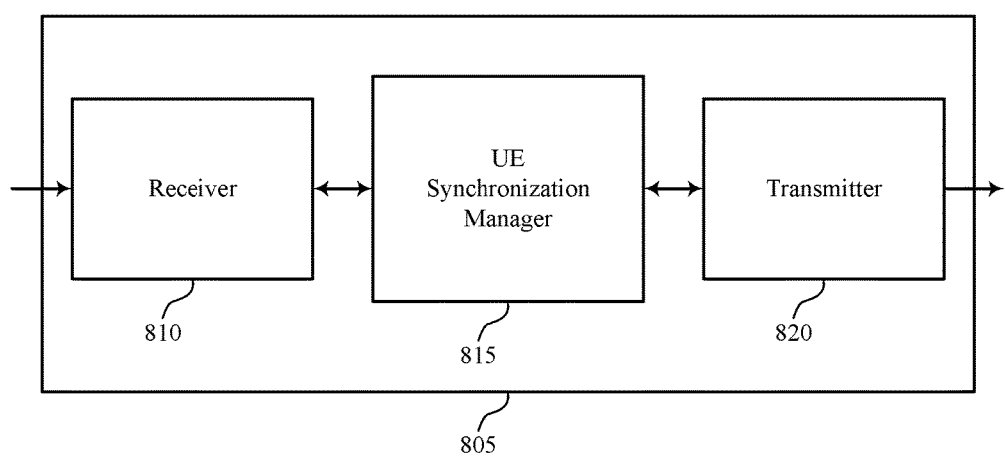
FIGS. 8 through 10 show block diagrams of a device that supports RACH conveyance of DL synchronization beam information for various DL-UL correspondence states in accordance with aspects of the present disclosure.

FIG. 8 shows a block diagram 800 of a wireless device 805 that supports RACH conveyance of DL synchronization beam information for various DL-UL correspondence states in accordance with various aspects of the present disclosure. Wireless device 805 may be an example of aspects of a UE 115 as described with reference to FIG. 1. Wireless device 805 may include receiver 810, UE synchronization manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to RACH conveyance of DL synchronization beam information for various DL-UL correspondence states, etc.). Information may be passed on to other components of the device. The receiver 810 may be an example of aspects of the transceiver 1135 described with reference to FIG. 11.

UE synchronization manager 815 may be an example of aspects of the UE synchronization manager 1115 described with reference to FIG. 11. UE synchronization manager 815 may receive a DL synchronization signal from a base station on one or more DL synchronization beams, and identify a selected DL beam of the one or more DL synchronization beams for communications from the base station to the UE.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas. Transmitter 820 may also transmit the RACH message/scheduling request message/beam recovery or beam tracking message to the base station using at least one of a resource or a RACH waveform selected based at least in part on the selected DL beam. In some cases, transmitting the RACH message/scheduling request message/beam recovery or beam tracking message includes: transmitting the RACH message/scheduling request message/beam recovery or beam tracking message during an entire duration of a corresponding random access subframe.

Figure 9:
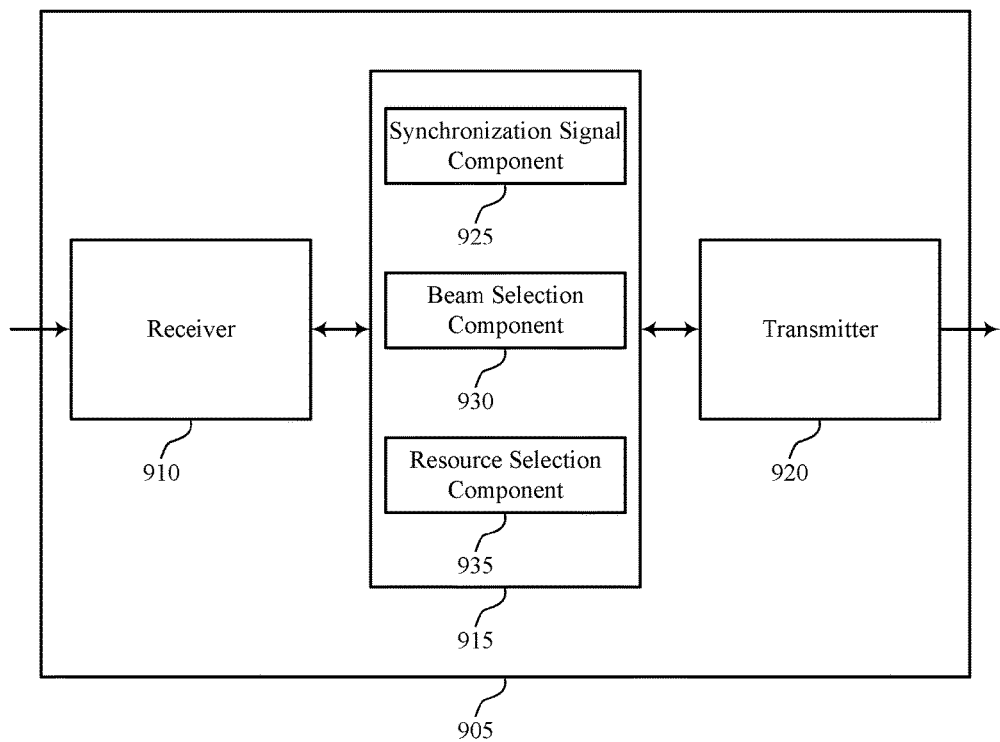

FIG. 9 shows a block diagram 900 of a wireless device 905 that supports RACH conveyance of DL synchronization beam information for various DL-UL correspondence states in accordance with various aspects of the present disclosure. Wireless device 905 may be an example of aspects of a wireless device 805 or a UE 115 as described with reference to FIGS. 1 and 8. Wireless device 905 may include receiver 910, UE synchronization manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to RACH conveyance of DL synchronization beam information for various DL-UL correspondence states, etc.). Information may be passed on to other components of the device. The receiver 910 may be an example of aspects of the transceiver 1135 described with reference to FIG. 11.

UE synchronization manager 915 may be an example of aspects of the UE synchronization manager 1115 described with reference to FIG. 11. UE synchronization manager 915 may also include synchronization signal component 925, beam selection component 930, and resource selection component 935.

Synchronization signal component 925 may receive a DL synchronization signal from a base station on one or more DL synchronization beams. In some cases, a correspondence is absent between the one or more DL synchronization beams from the base station and one or more UL receive beams at the base station. In some cases, the one or more DL synchronization beams are within a single symbol of a synchronization subframe, where selecting the resource and/or RACH waveform for transmission of the RACH message/scheduling request message/beam recovery or beam tracking message includes: selecting the resource and/or RACH waveform based on the symbol of the selected DL beam.

Beam selection component 930 may identify a selected DL beam of the one or more DL synchronization beams for communications from the base station to the UE. In some cases, identifying the selected DL beam includes: identifying the DL beam based on the DL synchronization signal on the one or more DL synchronization beams meeting a transmit power condition. In some cases, the selected DL beam from the base station is different from a selected UL beam from the UE. In some cases, a base station may identify a preferred UL beam based on the quality of a received RACH message. The base station may also transmit one or more subsequent messages to the UE conveying an indication of the preferred UL beam.

Resource selection component 935 may select a resource and/or RACH waveform for transmission of a RACH message/scheduling request message/beam recovery or beam tracking message to the base station, the resource and/or RACH waveform being selected based on the selected DL beam. In some cases, selecting the resource and/or RACH waveform includes: selecting the resource and/or RACH waveform based on an index of the selected DL beam. In some cases, selecting the resource and/or RACH waveform includes: selecting the resource and/or RACH waveform based on a symbol of a subframe of the DL synchronization signal of the selected DL beam. In some cases, the resource is associated with one or more tones in a component carrier. In some cases, the resource is associated with a component carrier.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
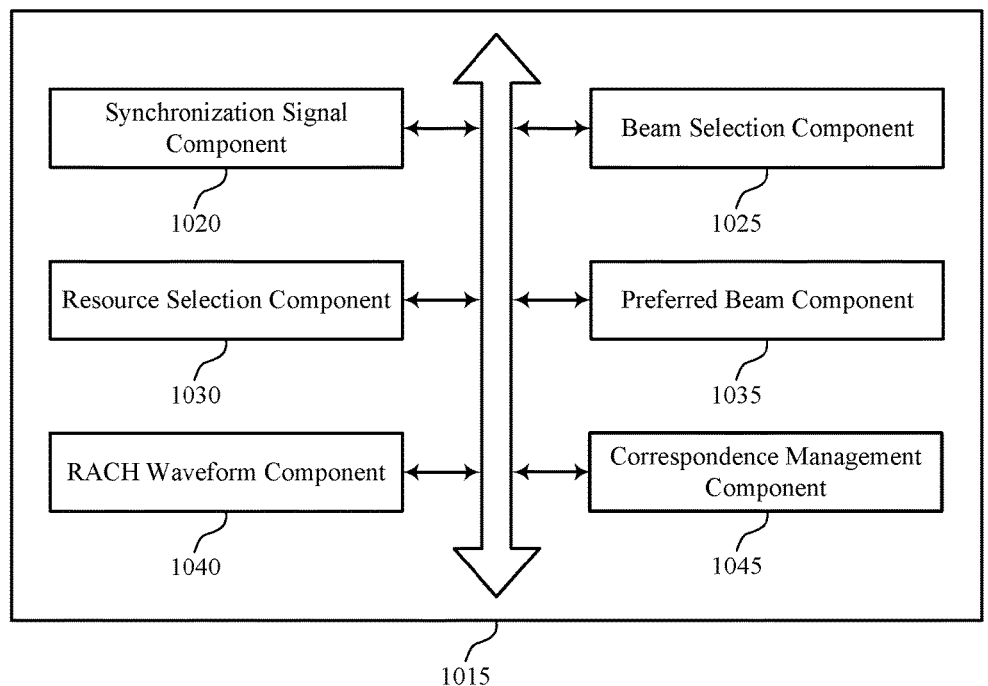

FIG. 10 shows a block diagram 1000 of a UE synchronization manager 1015 that supports RACH conveyance of DL synchronization beam information for various DL-UL correspondence states in accordance with various aspects of the present disclosure. The UE synchronization manager 1015 may be an example of aspects of a UE synchronization manager 815, a UE synchronization manager 915, or a UE synchronization manager 1115 described with reference to FIGS. 8, 9, and 11. The UE synchronization manager 1015 may include synchronization signal component 1020, beam selection component 1025, resource selection component 1030, preferred beam component 1035, RACH waveform component 1040, and correspondence management component 1045. Each of these modules may communicate, directly or indirectly, with one another (e.g., via one or more buses).

Synchronization signal component 1020 may receive a DL synchronization signal from a base station on one or more DL synchronization beams. Beam selection component 1025 may identify a selected DL beam of the one or more DL synchronization beams for communications from the base station to the UE. Resource selection component 1030 may select a resource and/or RACH waveform for transmission of a RACH message/scheduling request message/beam recovery or beam tracking message to the base station, the resource and/or RACH waveform being selected based on the selected DL beam. In some cases, the resource selection component 1030 may select a resource and/or RACH waveform for transmission of a RACH message/scheduling request message/beam recovery or beam tracking message to the base station based on an indication that correspondence is absent between the one or more DL synchronization beams from the base station and one or more UL receive beams at the base station.

Preferred beam component 1035 may identify a preferred beam from a number of beams transmitted by a base station. In some cases, identifying the selected DL beam includes: identifying a preferred DL beam based on a signal strength of the DL synchronization signal on the one or more DL synchronization beams, a signal quality of the DL synchronization signal on the one or more DL synchronization beams, or combinations thereof. RACH waveform component 1040 may select a RACH waveform for transmission of the RACH message/scheduling request message/beam recovery or beam tracking message to the base station, the RACH waveform being selected based on the selected DL beam. In some cases, selecting the RACH waveform includes: selecting a RACH preamble, a cyclic shift, or combinations thereof based on an index of the selected DL beam.

Correspondence management component 1045 may receive an indication that correspondence is absent between the one or more DL synchronization beams from the base station and one or more UL receive beams at the base station. In some cases, correspondence management component 1045 may transmit the RACH message/scheduling request message/beam recovery or beam tracking message to the base station during an entire duration of a RACH subframe based at least in part on the indication of the absent correspondence. In some cases, correspondence management component 1045 may receive the indication in a MIB or a SIB. In some cases, correspondence management component 1045 may transmit an indication that correspondence is absent between the one or more DL synchronization beams from the base station and one or more UL receive beams at the base station. In some cases, correspondence management component 1045 may transmit the RACH message/scheduling request message/beam recovery or beam tracking message to the base station during a first symbol of a first random access subframe and a second symbol of a second random access subframe. In some cases, correspondence management component 1045 may transmit the indication of the absent correspondence of a UE in a RACH message 3, PUCCH, or a PUSCH.

In some cases, correspondence management component 1045 may receive an indication of a nature of correspondence between the one or more DL synchronization beams from the base station and one or more UL beams from the UE. In some cases, the nature of correspondence corresponds to one of: full correspondence, partial correspondence, or no correspondence. In some cases, correspondence management component 1045 may determine that correspondence is present and select a transmission time for transmitting the RACH message/scheduling request message/beam recovery or beam tracking message to the base station based on the present correspondence. In some cases, the transmission time includes a symbol of a corresponding random access subframe. In some cases, correspondence management component 1045 may determine that there is partial correspondence and select a transmission time for transmitting the RACH message/scheduling request message/beam recovery or beam tracking message to the base station based on the partial correspondence. In some cases, the transmission time includes multiple symbols of a corresponding random access subframe. In some cases, a UE may transmit multiple RACH messages if there is no beam correspondence at UE.

In some cases, correspondence management component 1045 may select a transmission time, a frequency range, and a RACH preamble for transmitting the RACH message based on the nature of correspondence. In some cases, correspondence management component 1045 may select the resource or RACH waveform based at least in part on a symbol associated with the DL synchronization signal and the indication of the nature of correspondence. In some cases, correspondence management component 1045 may receive the indication of the nature of correspondence over a PBCH or an ePBCH. In some cases, correspondence management component 1045 may receive the indication of the nature of correspondence in a MIB or a SIB.

Figure 11:
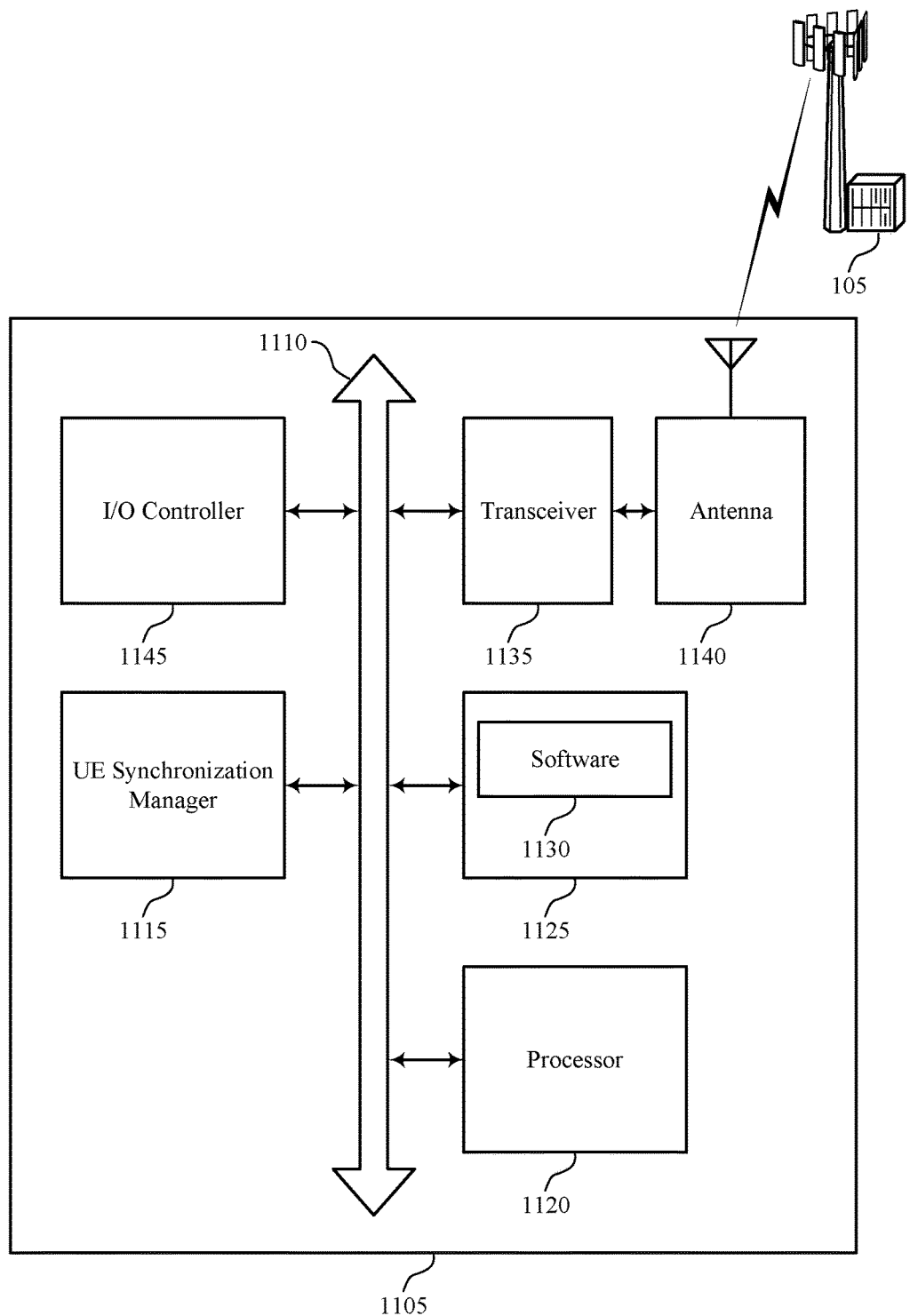
FIG. 11 illustrates a block diagram of a system including a UE that supports RACH conveyance of DL synchronization beam information for various DL-UL correspondence states in accordance with aspects of the present disclosure.

FIG. 11 shows a diagram of a system 1100 including a device 1105 that supports RACH conveyance of DL synchronization beam information for various DL-UL correspondence states in accordance with various aspects of the present disclosure. Device 1105 may be an example of or include the components of wireless device 805, wireless device 905, or a UE 115 as described above, for example, with reference to FIGS. 1, 8 and 9. Device 1105 may include components for bi-directional voice and data communications including components for transmitting and receiving communications, including UE synchronization manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting RACH conveyance of DL synchronization beam information for various DL-UL correspondence states).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support RACH conveyance of DL synchronization beam information for various DL-UL correspondence states. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system.

Figure 12:
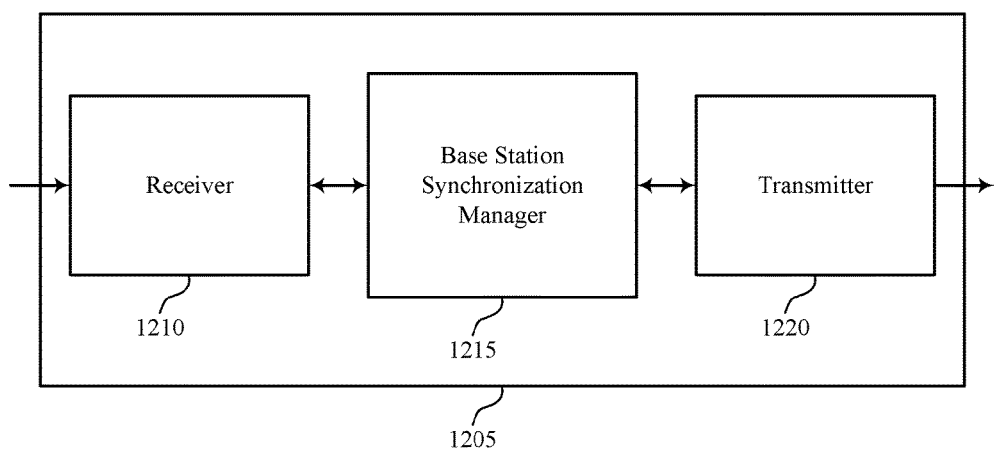
FIGS. 12 through 14 show block diagrams of a device that supports RACH conveyance of DL synchronization beam information for various DL-UL correspondence states in accordance with aspects of the present disclosure.

FIG. 12 shows a block diagram 1200 of a wireless device 1205 that supports RACH conveyance of DL synchronization beam information for various DL-UL correspondence states in accordance with various aspects of the present disclosure. Wireless device 1205 may be an example of aspects of a base station 105 as described with reference to FIG. 1. Wireless device 1205 may include receiver 1210, base station synchronization manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to RACH conveyance of DL synchronization beam information for various DL-UL correspondence states, etc.). Information may be passed on to other components of the device. The receiver 1210 may be an example of aspects of the transceiver 1535 described with reference to FIG. 15.

Base station synchronization manager 1215 may be an example of aspects of the base station synchronization manager 1515 described with reference to FIG. 15. Base station synchronization manager 1215 may transmit a DL synchronization signal on one or more DL synchronization beams, receive, on at least one of a resource or a RACH waveform, a RACH message/scheduling request message/ beam recovery or beam tracking message from a UE, and identify, based on the resource and/or RACH waveform, a selected DL beam of the one or more DL synchronization beams for communications from the base station to the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas. Transmitter 1220 may also transmit one or more subsequent messages to the UE using the selected DL beam.

Figure 13:
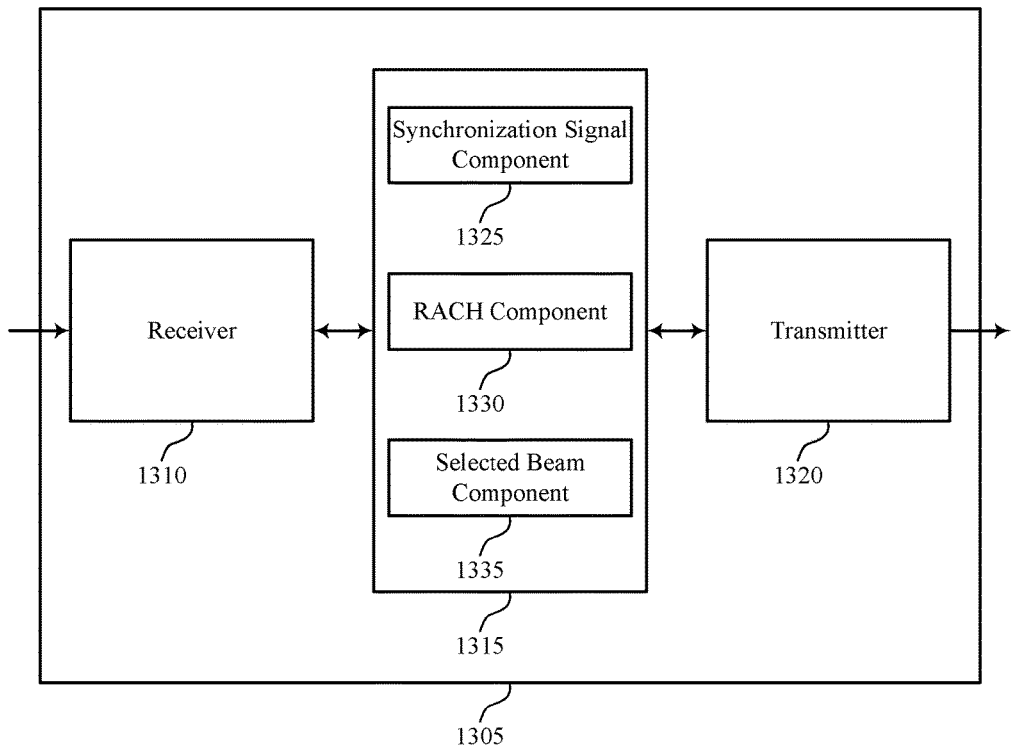

FIG. 13 shows a block diagram 1300 of a wireless device 1305 that supports RACH conveyance of DL synchronization beam information for various DL-UL correspondence states in accordance with various aspects of the present disclosure. Wireless device 1305 may be an example of aspects of a wireless device 1205 or a base station 105 as described with reference to FIGS. 1 and 12. Wireless device 1305 may include receiver 1310, base station synchronization manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to RACH conveyance of DL synchronization beam information for various DL-UL correspondence states, etc.). Information may be passed on to other components of the device. The receiver 1310 may be an example of aspects of the transceiver 1535 described with reference to FIG. 15.

Base station synchronization manager 1315 may be an example of aspects of the base station synchronization manager 1515 described with reference to FIG. 15. Base station synchronization manager 1315 may also include synchronization signal component 1325, RACH component 1330, and selected beam component 1335.

Synchronization signal component 1325 may transmit a DL synchronization signal on one or more DL synchronization beams. In some cases, a correspondence is absent between the one or more DL synchronization beams from the base station and one or more UL receive beams at the base station.

RACH component 1330 may receive, on a resource and/or RACH waveform, a RACH message/scheduling request message/beam recovery or beam tracking message from a UE. In some cases, receiving the RACH message/ scheduling request message/beam recovery or beam tracking message includes: receiving the RACH message/scheduling request message/beam recovery or beam tracking message during an entire duration of a corresponding random access subframe. In some cases, receiving the RACH message/scheduling request message/beam recovery or beam tracking message includes: receiving the RACH message/scheduling request message/beam recovery or beam tracking message on a set of UL beams. In some cases, the resource is associated with one or more tones in a component carrier. In some cases, the resource is associated with a component carrier.

Selected beam component 1335 may identify, based on the resource and/or RACH waveform, a selected DL beam of the one or more DL synchronization beams for communications from the base station to the UE. In some cases, identifying the selected DL beam includes: associating the resource and/or RACH waveform with an index of the selected DL beam. In some cases, identifying the selected DL beam includes: associating the resource and/or RACH waveform with a symbol of a subframe of the DL synchronization signal of the selected DL beam. In some cases, identifying the selected DL beam further includes: identifying the selected DL beam based on a RACH waveform of the RACH message/scheduling request message/beam recovery or beam tracking message. In some cases, identifying the selected DL beam includes: identifying the selected DL beam based on a RACH preamble of the RACH message, a cyclic shift of the RACH message, or combinations thereof. In some cases, the selected DL beam from the base station is different from a selected UL beam from the UE.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
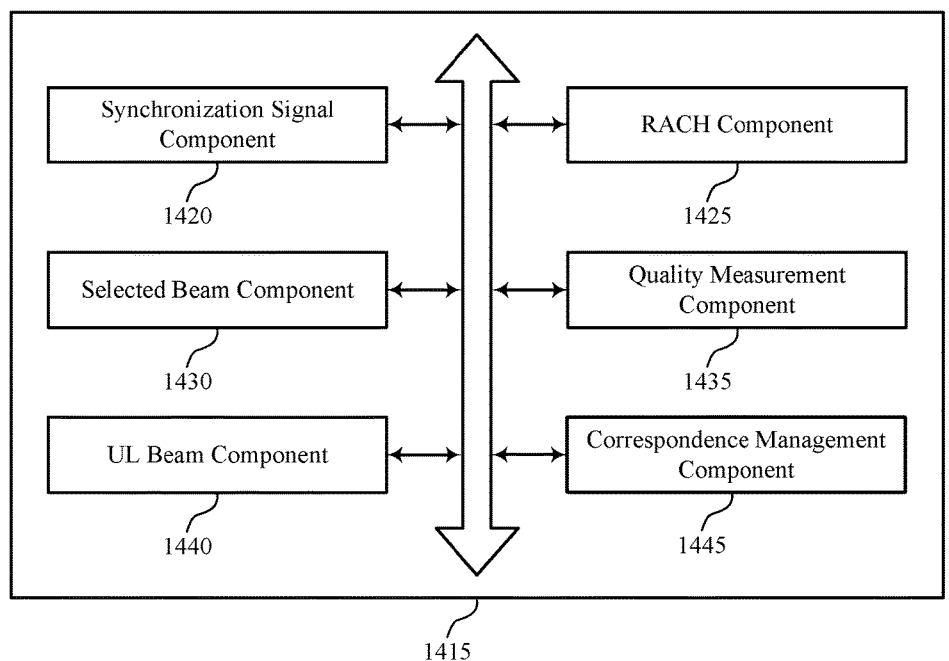

FIG. 14 shows a block diagram 1400 of a base station synchronization manager 1415 that supports RACH conveyance of DL synchronization beam information for various DL-UL correspondence states in accordance with various aspects of the present disclosure. The base station synchronization manager 1415 may be an example of aspects of a base station synchronization manager 1515 described with reference to FIGS. 12, 13, and 15. The base station synchronization manager 1415 may include synchronization signal component 1420, RACH component 1425, selected beam component 1430, quality measurement component 1435, UL beam component 1440, and correspondence management component 1445. Each of these modules may communicate, directly or indirectly, with one another (e.g., via one or more buses).

Synchronization signal component 1420 may transmit a DL synchronization signal on one or more DL synchronization beams. RACH component 1425 may receive, on at least one of a resource or a RACH waveform, a RACH message/scheduling request message/beam recovery or beam tracking message from a UE. Selected beam component 1430 may identify, based on the resource and/or RACH waveform, a selected DL beam of the one or more DL synchronization beams for communications from the base station to the UE.

Quality measurement component 1435 may measure a quality of the RACH message/scheduling request message/ beam recovery or beam tracking message received on the set of UL beams. In some cases, measuring the quality of the RACH message/scheduling request message/beam recovery or beam tracking message includes: measuring one or more of a reference signal received power (RSRP), a received signal strength indicator (RSSI), a reference signal received quality (RSRQ), a signal to noise ratio (signal-to-noise ratio (SNR)), or a signal to interference plus noise ratio (SINR). UL beam component 1440 may determine a selected UL beam for communications from the UE to the base station based on the quality.

Correspondence management component 1445 may transmit an indication that correspondence is absent between the one or more DL synchronization beams from the base station and one or more UL receive beams at the base station. In some cases, correspondence management component 1445 may transmit the indication in a MIB or a SIB. In some cases, correspondence management component 1445 may receive an indication that correspondence is absent between the one or more DL synchronization beams from the base station and one or more UL receive beams at the base station and map DL beams used to transmit CSI-RSs to UL beams used to transmit SRSs or map UL beams used to transmit SRSs to DL beams used to transmit CSI-RSs. In some cases, correspondence management component 1445 may receive an indication that correspondence is absent between the one or more DL synchronization beams from the base station and one or more UL receive beams at the base station and map DL beams used in DL beam training to UL beams used in UL beam training or map UL beams used in UL beam training to DL beams used in DL beam training.

Figure 15:
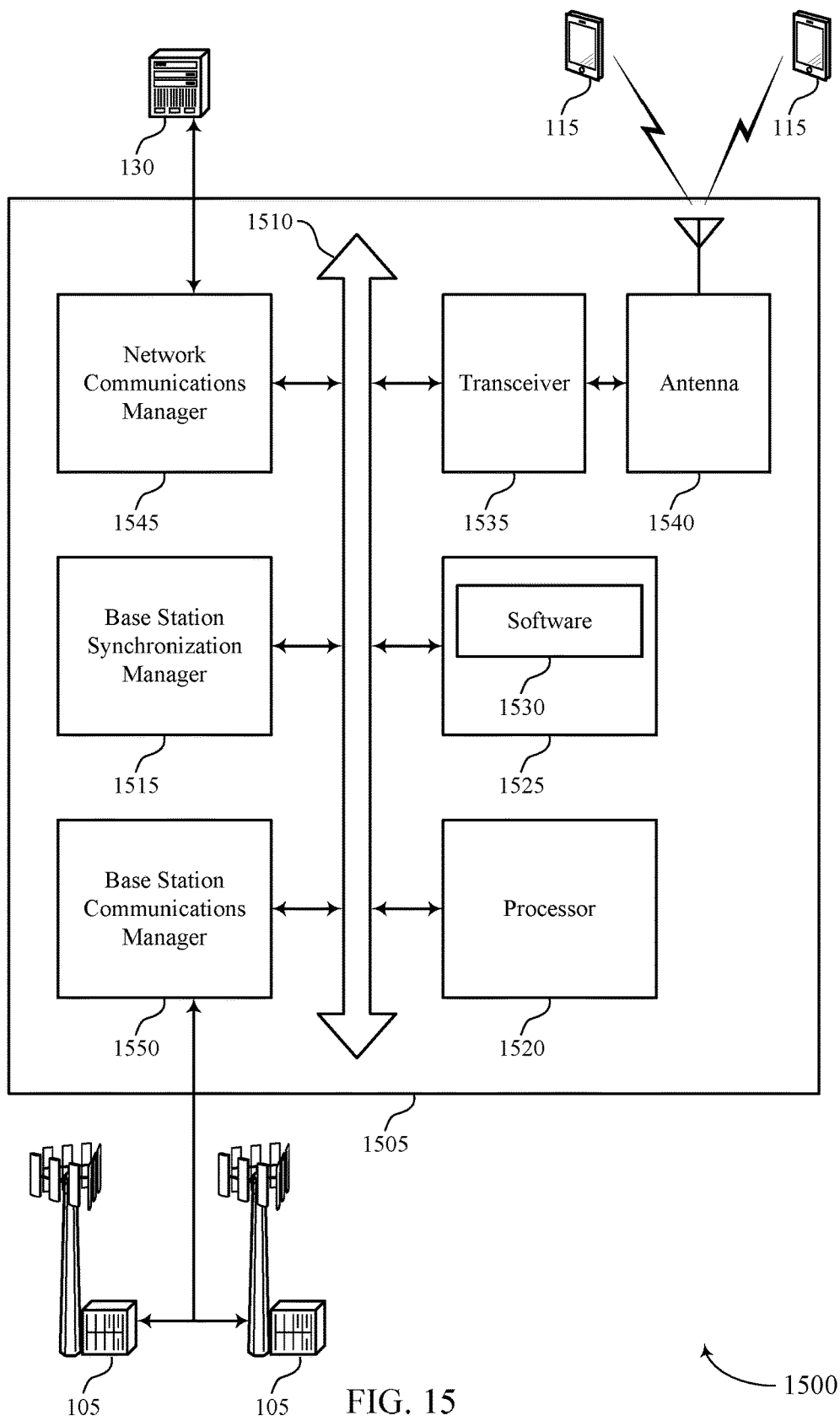
FIG. 15 illustrates a block diagram of a system including a base station that supports RACH conveyance of DL synchronization beam information for various DL-UL correspondence states in accordance with aspects of the present disclosure.

FIG. 15 shows a diagram of a system 1500 including a device 1505 that supports RACH conveyance of DL synchronization beam information for various DL-UL correspondence states in accordance with various aspects of the present disclosure. Device 1505 may be an example of or include the components of base station 105 as described above, for example, with reference to FIG. 1. Device 1505 may include components for bi-directional voice and data communications including components for transmitting and receiving communications, including base station synchronization manager 1515, processor 1520, memory 1525, software 1530, transceiver 1535, antenna 1540, network communications manager 1545, and base station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting RACH conveyance of DL synchronization beam information for various DL-UL correspondence states).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support RACH conveyance of DL synchronization beam information for various DL-UL correspondence states. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Base station communications manager 1550 may manage communications with other base station 105, and may include a controller or scheduler for controlling communications with UEs 115 in cooperation with other base stations 105. For example, the base station communications manager 1550 may coordinate scheduling for transmissions to UEs 115 for various interference mitigation techniques such as beamforming or joint transmission. In some examples, base station communications manager 1550 may provide an X2 interface within an Long Term Evolution (LTE)/LTE-A wireless communication network technology to provide communication between base stations 105.

Figure 16:
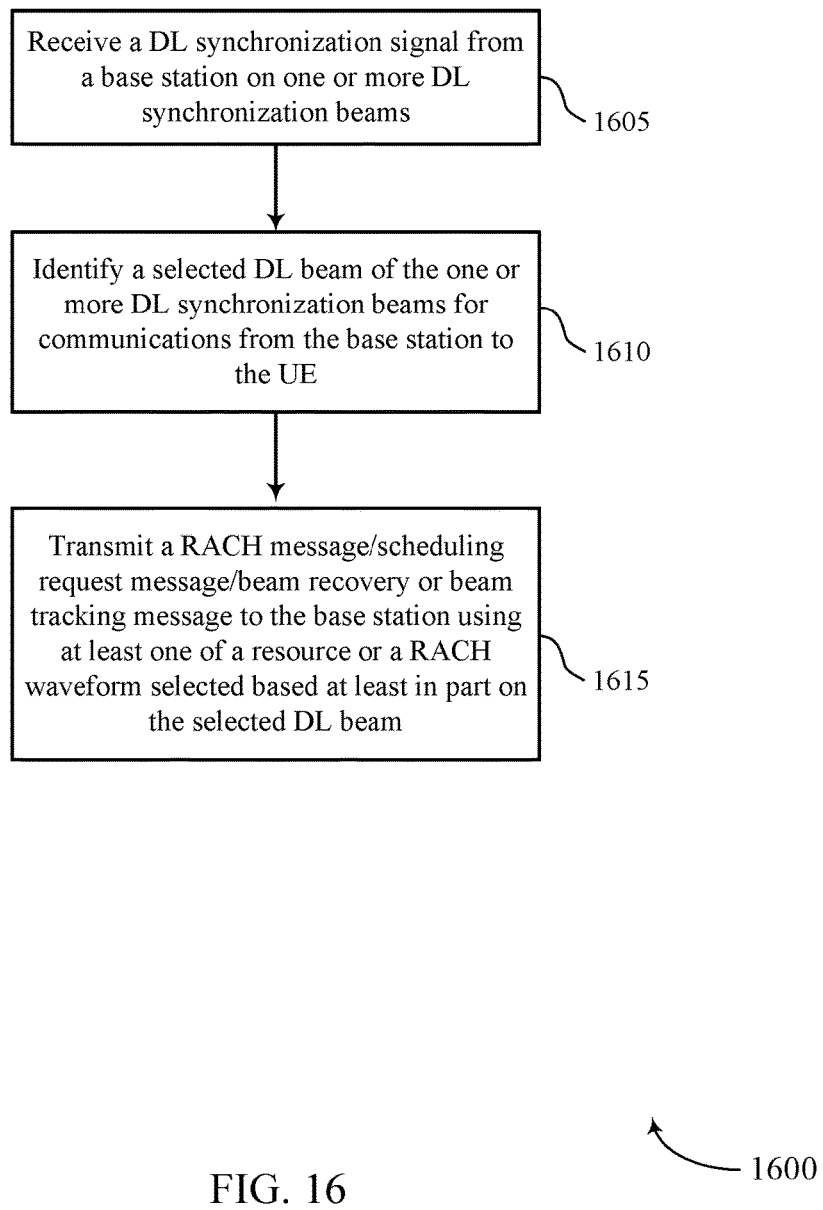
FIGS. 16 through 19 illustrate methods for RACH conveyance of DL synchronization beam information for various DL-UL correspondence states in accordance with aspects of the present disclosure.

FIG. 16 shows a flowchart illustrating a method 1600 for RACH conveyance of DL synchronization beam information for various DL-UL correspondence states in accordance with various aspects of the present disclosure. The operations of method 1600 may be implemented by a UE 115 or its components as described herein. For example, the operations of method 1600 may be performed by a UE synchronization manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a DL synchronization signal from a base station on one or more DL synchronization beams. The operations of block 1605 may be performed according to the methods described with reference to FIGS. 1 through 5. In certain examples, aspects of the operations of block 1605 may be performed by a synchronization signal component as described with reference to FIGS. 8 through 11.

At block 1610 the UE 115 may identify a selected DL beam of the one or more DL synchronization beams for communications from the base station to the UE. The operations of block 1610 may be performed according to the methods described with reference to FIGS. 1 through 5. In certain examples, aspects of the operations of block 1610 may be performed by a beam selection component as described with reference to FIGS. 8 through 11.

At block 1615 the UE 115 may transmit the RACH message/scheduling request message/beam recovery or beam tracking message to the base station using at least one of a resource or a RACH waveform selected based at least in part on the selected DL beam. The operations of block 1615 may be performed according to the methods described with reference to FIGS. 1 through 5. In certain examples, aspects of the operations of block 1615 may be performed by a transmitter as described with reference to FIGS. 8 through 11.

Figure 17:
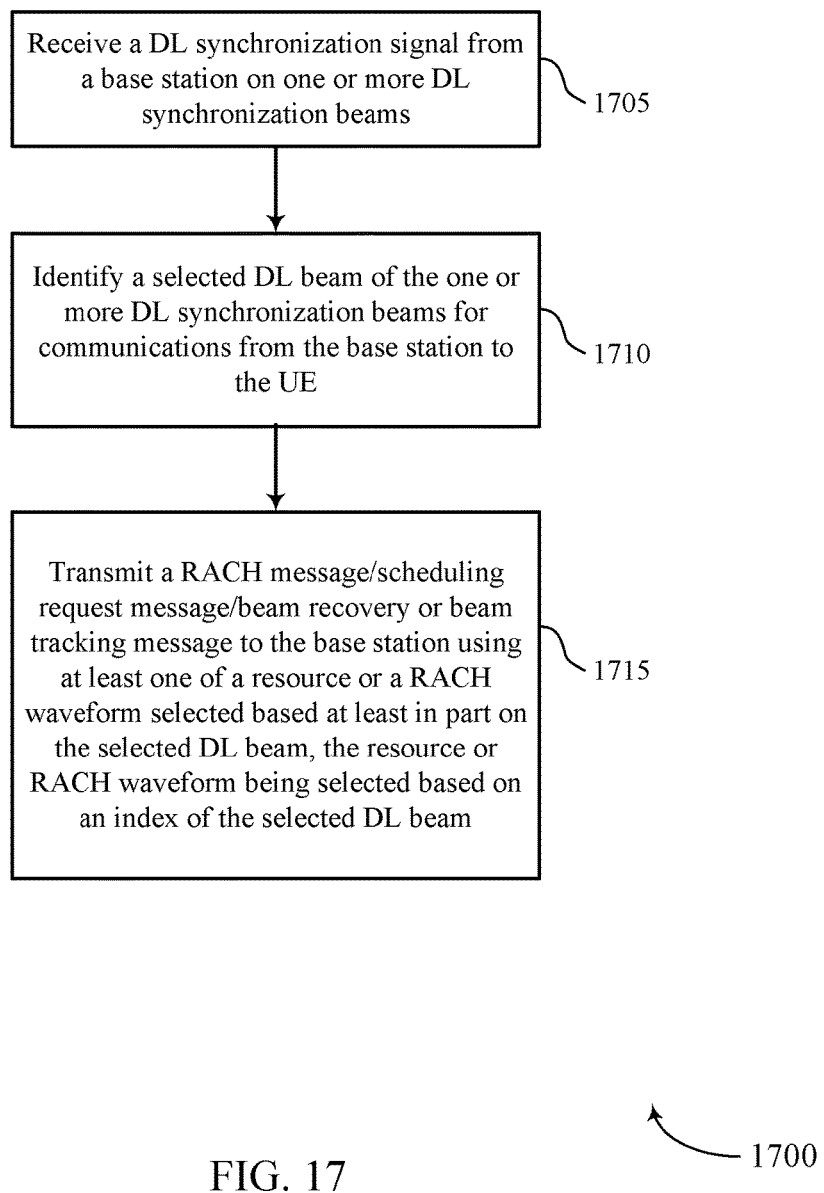

FIG. 17 shows a flowchart illustrating a method 1700 for RACH conveyance of DL synchronization beam information for various DL-UL correspondence states in accordance with various aspects of the present disclosure. The operations of method 1700 may be implemented by a UE 115 or its components as described herein. For example, the operations of method 1700 may be performed by a UE synchronization manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a DL synchronization signal from a base station on one or more DL synchronization beams. The operations of block 1705 may be performed according to the methods described with reference to FIGS. 1 through 5. In certain examples, aspects of the operations of block 1705 may be performed by a synchronization signal component as described with reference to FIGS. 8 through 11.

At block 1710 the UE 115 may identify a selected DL beam of the one or more DL synchronization beams for communications from the base station to the UE. The operations of block 1710 may be performed according to the methods described with reference to FIGS. 1 through 5. In certain examples, aspects of the operations of block 1710 may be performed by a beam selection component as described with reference to FIGS. 8 through 11.

At block 1715 the UE 115 may transmit the RACH message/scheduling request message/beam recovery or beam tracking message to the base station using at least one of a resource or a RACH waveform selected based at least in part on the selected DL beam, the resource or RACH waveform may also be selected based on an index of the selected DL beam. The operations of block 1715 may be performed according to the methods described with reference to FIGS. 1 through 5. In certain examples, aspects of the operations of block 1715 may be performed by a transmitter as described with reference to FIGS. 8 through 11.

Figure 18:
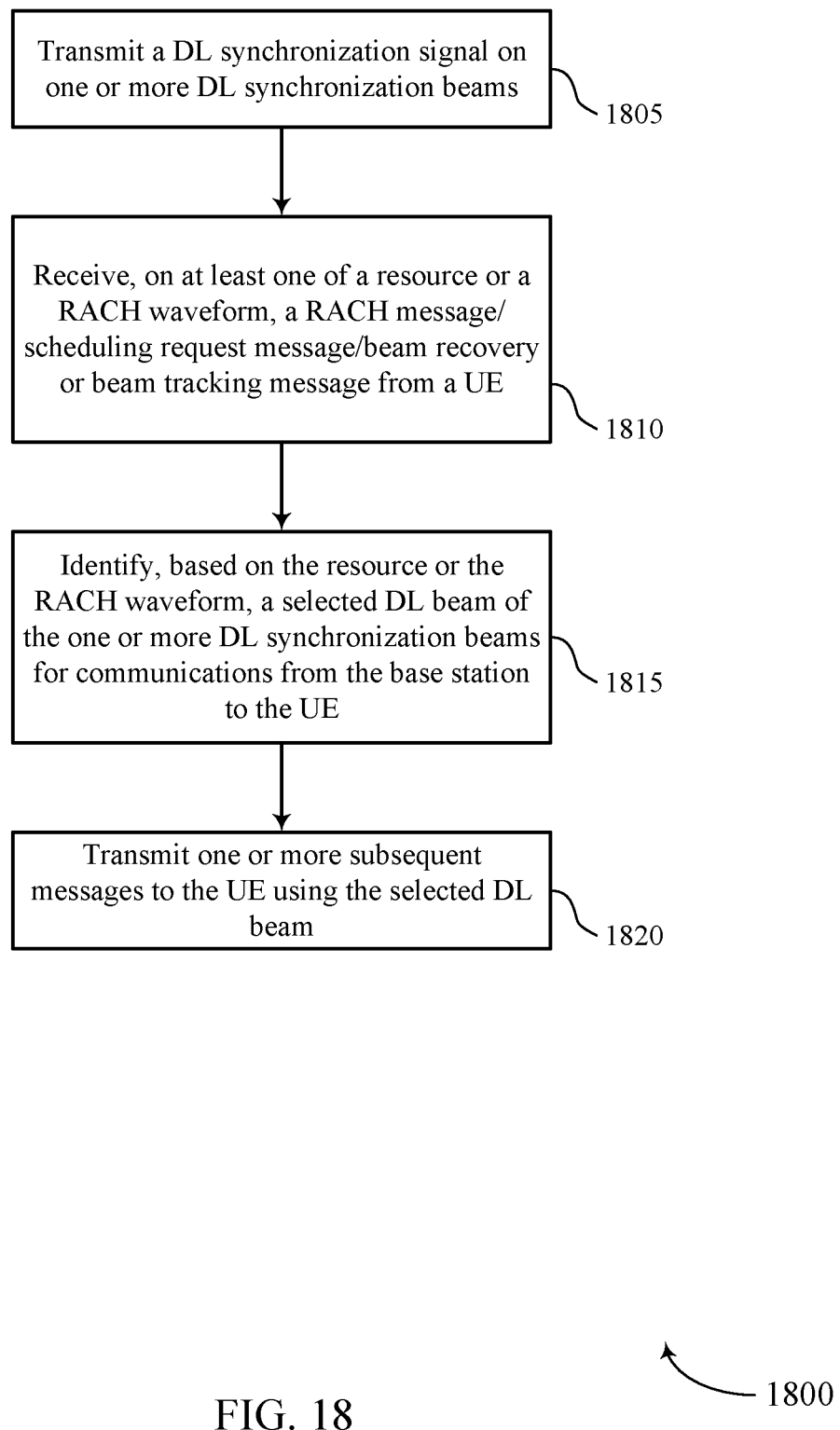

FIG. 18 shows a flowchart illustrating a method 1800 for RACH conveyance of DL synchronization beam information for various DL-UL correspondence states in accordance with various aspects of the present disclosure. The operations of method 1800 may be implemented by a base station 105 or its components as described herein. For example, the operations of method 1800 may be performed by a base station synchronization manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit a DL synchronization signal on one or more DL synchronization beams. The operations of block 1805 may be performed according to the methods described with reference to FIGS. 1 through 5. In certain examples, aspects of the operations of block 1805 may be performed by a synchronization signal component as described with reference to FIGS. 12 through 15.

At block 1810 the base station 105 may receive, on at least one of a resource or a RACH waveform, a RACH message/scheduling request message/beam recovery or beam tracking message from a UE. The operations of block 1810 may be performed according to the methods described with reference to FIGS. 1 through 5. In certain examples, aspects of the operations of block 1810 may be performed by a RACH component as described with reference to FIGS. 12 through 15.

At block 1815 the base station 105 may identify, based at least in part on the resource or the RACH waveform, a selected DL beam of the one or more DL synchronization beams for communications from the base station to the UE. The operations of block 1815 may be performed according to the methods described with reference to FIGS. 1 through 5. In certain examples, aspects of the operations of block 1815 may be performed by a selected beam component as described with reference to FIGS. 12 through 15.

At block 1820 the base station 105 may transmit one or more subsequent messages to the UE using the selected DL beam. The operations of block 1820 may be performed according to the methods described with reference to FIGS. 1 through 5. In certain examples, aspects of the operations of block 1820 may be performed by a transmitter as described with reference to FIGS. 12 through 15.

Figure 19:
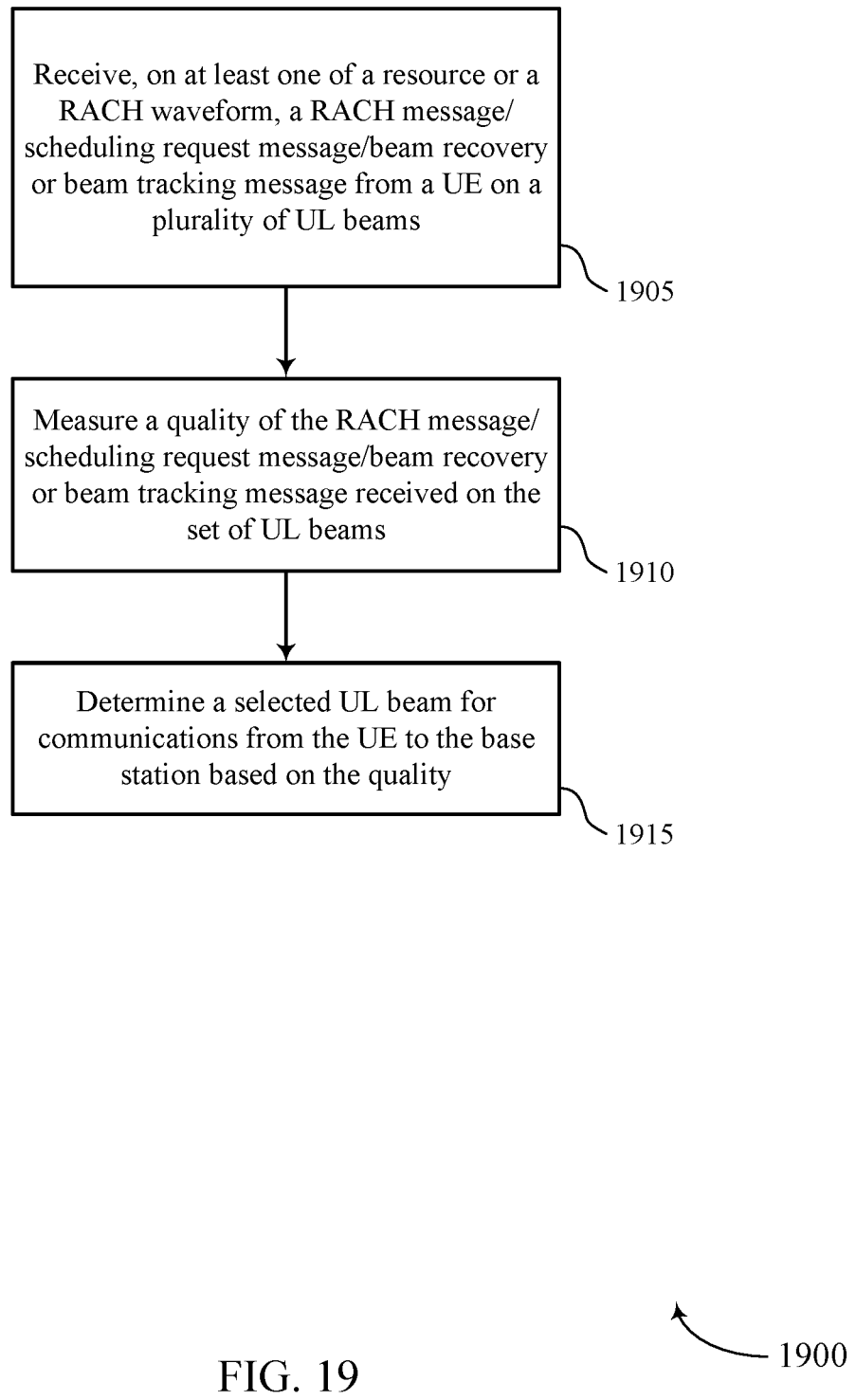

FIG. 19 shows a flowchart illustrating a method 1900 for RACH conveyance of DL synchronization beam information for various DL-UL correspondence states in accordance with various aspects of the present disclosure. The operations of method 1900 may be implemented by a base station 105 or its components as described herein. For example, the operations of method 1900 may be performed by a base station synchronization manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905, the base station 105 may receive, on at least one of a resource or a RACH waveform, a RACH message/scheduling request message/beam recovery or beam tracking message from a UE on a plurality of UL beams. The operations of block 1905 may be performed according to the methods described with reference to FIGS. 1 through 5. In certain examples, aspects of the operations of block 1905 may be performed by a RACH component as described with reference to FIGS. 12 through 15.

At block 1910 the base station 105 may measure a quality of the RACH message/scheduling request message/beam recovery or beam tracking message received on the plurality of UL beams. The operations of block 1910 may be performed according to the methods described with reference to FIGS. 1 through 5. In certain examples, aspects of the operations of block 1910 may be performed by a quality measurement component as described with reference to FIGS. 12 through 15.

At block 1915 the base station 105 may determine or identify a selected UL beam, for example a preferred UL beam, for communications from the UE to the base station based at least in part on the measured quality of a RACH message. The base station may also transmit one or more subsequent messages to the UE conveying an indication of the preferred UL beam, for example in a RACH msg2. The one or more subsequent messages to the UE may include an identification or index of the preferred UL beam, for example an OCC index. The operations of block 1915 may be performed according to the methods described with reference to FIGS. 1 through 5. In certain examples, aspects of the operations of block 1915 may be performed by a UL beam component as described with reference to FIGS. 12 through 15.

In some cases, receiving the RACH message/scheduling request message/beam recovery or beam tracking message comprises: receiving the RACH message/scheduling request message/beam recovery or beam tracking message on a plurality of UL beams.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a downlink (DL) signal from a base station on one or more DL beams;
    identifying a selected DL beam of the one or more DL beams for communications from the base station to the UE;
    selecting at least one of a resource or a waveform for a beam recovery or beam tracking message based at least in part on the selected DL beam of the one or more DL beams; and
    transmitting the beam recovery or beam tracking message to the base station using at least one of the resource or the waveform selected based at least in part on the selected DL beam.

2. The method of claim 1, wherein the waveform comprises one of a scheduling request or a random access channel (RACH) waveform.

3. The method of claim 1, wherein the DL signal comprises a synchronization signal or a reference signal.

4. The method of claim 1, wherein selecting the resource or waveform comprises:
    selecting the resource or waveform based at least in part on an index of the selected DL beam or a symbol of a subframe of the DL signal of the selected DL beam.

5. The method of claim 1, wherein transmitting the beam recovery or beam tracking message comprises:
    transmitting the beam recovery or beam tracking message during an entire duration of a corresponding random access subframe.

6. The method of claim 1, wherein identifying the selected DL beam comprises:

identifying a preferred DL beam based at least in part on a signal strength of the DL signal on the one or more DL beams, a signal quality of the DL signal on the one or more DL beams, or combinations thereof.

7. The method of claim 1, wherein identifying the selected DL beam comprises:
identifying the DL beam based at least in part on the DL signal on the one or more DL beams meeting a transmit power condition.

8. The method of claim 1, further comprising:
selecting at least one of the resource or the waveform for transmission of the beam recovery or beam tracking message to the base station, the resource or the waveform being selected based at least in part on the selected DL beam.

9. The method of claim 1, wherein a correspondence is absent between the one or more DL beams and one or more uplink (UL) receive beams at the UE, wherein the absent correspondence is associated with the one or more DL beams having different beam directions than the one or more UL beams.

10. The method of claim 1, further comprising:
identifying that correspondence is absent between the one or more DL beams from the base station and one or more uplink (UL) receive beams at the base station by receiving information from the base station in a master information block (MIB) or a system information block (SIB).

11. The method of claim 10, further comprising:
transmitting the beam recovery or beam tracking message to the base station during an entire duration of a random access channel (RACH) subframe based at least in part on the identification of the absent correspondence.

12. The method of claim 10, further comprising:
selecting the resource or waveform based at least in part on the identification of the absent correspondence.

13. The method of claim 1, further comprising:
transmitting an indication that correspondence is absent between the one or more DL beams from the base station and one or more uplink (UL) beams at the UE; and
transmitting the indication of the absent correspondence in a random access channel (RACH) message 3, a physical uplink control channel (PUCCH), or a physical uplink shared channel (PUSCH).

14. The method of claim 13, further comprising:
transmitting the beam recovery or beam tracking message to the base station during a first symbol of a first random access subframe and a second symbol of a second random access subframe.

15. The method of claim 1, further comprising:
receiving an indication of a nature of correspondence between the one or more DL beams at the base station and one or more uplink (UL) beams at the base station, wherein the nature of the correspondence corresponds to one of: full correspondence, or no correspondence.

16. The method of claim 15, further comprising:
determining that the correspondence is present based on the indication of the nature of the correspondence; and
selecting a transmission time for transmitting the beam recovery or beam tracking message to the base station based on the present correspondence, wherein the transmission time comprises a symbol of a corresponding random access subframe.

17. The method of claim 15, further comprising:
determining that there is partial correspondence based on the indication of the nature of the correspondence; and
selecting a transmission time for transmitting the beam recovery or beam tracking message to the base station based on the partial correspondence, wherein the transmission time comprises multiple symbols of a corresponding random access subframe.

18. The method of claim 15, further comprising:
selecting the resource or waveform based at least in part on a symbol associated with the DL signal and the indication of the nature of correspondence.

19. The method of claim 15, further comprising:
receiving the indication of the nature of the correspondence over a physical broadcast channel (PBCH) or an extended PBCH (ePBCH), or in a master information block (MIB) or a system information block (SIB).

20. The method of claim 1, wherein the selected DL beam from the base station is different from a selected uplink (UL) beam from the UE.

21. The method of claim 1, wherein the one or more DL beams are within a single symbol of a synchronization subframe, wherein selecting the resource or the waveform for transmission of the beam recovery or beam tracking message comprises:
selecting the resource or the waveform based at least in part on the symbol of the selected DL beam.

22. The method of claim 1, wherein the resource is associated with one or more tones in a component carrier, or a component carrier, or a combination thereof.

23. The method of claim 1, further comprising:
selecting a combination of the resource and the waveform to transmit a scheduling request to the base station.

24. A method for wireless communication at a base station, comprising:
transmitting a downlink (DL) signal on one or more DL beams;
receiving, on at least one of a resource or a waveform, a beam recovery or beam tracking message from a user equipment (UE);
identifying, based at least in part on the resource or the waveform, a selected DL beam of the one or more DL beams for communications from the base station to the UE; and
transmitting one or more subsequent messages to the UE using the selected DL beam.

25. The method of claim 24, wherein identifying the selected DL beam comprises:
associating the resource or the waveform with an index of the selected DL beam or with a symbol of a subframe of the DL signal of the selected DL beam.

26. The method of claim 24, wherein receiving the beam recovery or beam tracking message comprises:
receiving the beam recovery or beam tracking message on a plurality of uplink (UL) beams.

27. The method of claim 26, further comprising:
measuring a quality of the beam recovery or beam tracking message received on the plurality of UL beams; and
determining a selected UL beam for communications from the UE to the base station based at least in part on the quality.

28. The method of claim 27, wherein measuring the quality of the beam recovery or beam tracking message comprises:
measuring one or more of a reference signal received power (RSRP), a received signal strength indicator (RSSI), a reference signal received quality (RSRQ), a signal to noise ratio (SNR), or a signal to interference plus noise ratio (SINR).

29. The method of claim 24, wherein a correspondence is absent between the one or more DL beams from the base station and one or more uplink (UL) beams at the base station, wherein the absent correspondence is associated with the one or more DL beams having different beam directions than the one or more UL receive beams.

30. The method of claim 24, further comprising:
identifying that correspondence is absent between the one or more DL beams from the base station and one or more uplink (UL) beams at the base station; and
transmitting an indication of the absent correspondence in a master information block (MIB) or a system information block (SIB).

\* \* \* \* \*